(12) United States Patent
Li et al.

(10) Patent No.: US 8,797,837 B2
(45) Date of Patent: Aug. 5, 2014

(54) SYSTEM AND METHOD FOR IN-PHASE/QUADRATURE MULTIPLEXING

(75) Inventors: Xiaochen Li, Jersey City, NJ (US); Chiu Ngo, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 601 days.

(21) Appl. No.: 12/552,940

(22) Filed: Sep. 2, 2009

(65) Prior Publication Data

US 2010/0135149 A1     Jun. 3, 2010

Related U.S. Application Data

(60) Provisional application No. 61/119,639, filed on Dec. 3, 2008, provisional application No. 61/145,050, filed on Jan. 15, 2009.

(51) Int. Cl.
     *H04J 11/00*      (2006.01)
     *H04L 1/00*      (2006.01)

(52) U.S. Cl.
     USPC ........... 370/210; 370/241; 370/464; 370/252; 375/298; 375/237; 375/231

(58) Field of Classification Search
     USPC .......... 370/210, 241, 464, 252; 375/298, 237, 375/231, 341; 455/144; 398/98
     See application file for complete search history.

(56) References Cited

U.S. PATENT DOCUMENTS

| | | | |
|---|---|---|---|
| 5,732,337 A * | 3/1998 | Wargnier et al. | 455/144 |
| 5,917,856 A * | 6/1999 | Torsti | 375/231 |
| 6,201,801 B1 | 3/2001 | Dent | |
| 7,136,627 B2 | 11/2006 | Hamalainen et al. | |
| 7,653,024 B2 | 1/2010 | Dekorsy et al. | |
| 2002/0186797 A1 * | 12/2002 | Robinson | 375/341 |
| 2002/0191569 A1 * | 12/2002 | Sung et al. | 370/335 |
| 2003/0081656 A1 * | 5/2003 | Buehrer et al. | 375/142 |
| 2006/0120480 A1 * | 6/2006 | Klomsdorf et al. | 375/298 |
| 2008/0130768 A1 * | 6/2008 | Huang et al. | 375/260 |
| 2009/0169213 A1 * | 7/2009 | Lowery et al. | 398/98 |
| 2010/0130264 A1 | 5/2010 | Yong et al. | |
| 2011/0268224 A1 | 11/2011 | Khojastepour | |

OTHER PUBLICATIONS

Nabar, R.U. et al., "Performance of Multiantenna Signaling Techniques in the Presence of Polarization Diversity", IEEE Transactions on Signal Processing, vol. 50, No. 10, IEEE, Oct. 2002, pp. 2553-2562, United States.

(Continued)

*Primary Examiner* — Charles C Jiang
*Assistant Examiner* — Jamal Javaid
(74) *Attorney, Agent, or Firm* — Kenneth L. Sherman, Esq.; Michael Zarrabian, Esq.; Sherman & Zarrabian LLP

(57) ABSTRACT

Systems and methods for multiplexing signals are disclosed. In one embodiment, the method comprises receiving a first signal having at least a real component, receiving a second signal having at least a real component, generating an in-phase signal based, at least in part, on the first signal, the in-phase signal being real in a first domain, generating a quadrature signal based, at least in part, on the second signal, the quadrature signal being imaginary in the first domain, adding the in-phase signal and the quadrature signal to generate a multiplexed signal, and transmitting the multiplexed signal.

40 Claims, 20 Drawing Sheets

(56) References Cited

OTHER PUBLICATIONS

Schumacher, L. et al., "Simulating Polarisation Diversity and Power Allocation in MIMO Channels", Proceedings of the Fourth European Mobile Communications Conference (EPMCC 2001), Feb. 20, 2001 to Feb. 22, 2001, Österreichischer Verband für Elektrotechnik (OVE), 2001, pp. 1-5, Vienna, Austria.

Cetiner, B.A. et al., "A MIMO System with Multifunctional Reconfigurable Antennas", IEEE Antennas and Wireless Propagation Letters (AWPL), IEEE, Dec. 2006, pp. 463-466, United States.

Deng, Y. et al., "Performance of MIMO Systems with Combined Polarization Multiplexing and Transmit Diversity", Proceedings of the IEEE 61st Vehicular Technology Conference (VTC 2005-Spring), vol. 2, IEEE, 2005, pp. 869-873, United States.

U.S. Non-final Office Action for U.S. Appl. No. 12/540,129 mailed Mar. 2, 2012.

U.S. Final Office Action for U.S. Appl. No. 12/540,129 mailed Jul. 26, 2012.

U.S. Advisory Action for U.S. Appl. No. 12/540,129 mailed Oct. 3, 2012.

U.S. Non-Final for U.S. Appl. No. 12/540,129 mailed Sep. 4, 2013.

U.S. Notice of Allowance for U.S. Appl. No. 12/540,129 mailed Jan. 8, 2014.

\* cited by examiner

SYSTEM AND METHOD FOR IN-PHASE/QUADRATURE MULTIPLEXING

CROSS-REFERENCE TO RELATED APPLICATIONS

This application claims priority under 35 U.S.C. §119(e) to U.S. Provisional App. No. 61/119,639, filed Dec. 3, 2008, and of U.S. Provisional App. No. 61/145,050, filed Jan. 15, 2009. Both applications are herein incorporated by reference in their entirety.

BACKGROUND

1. Field

The present disclosure is directed to multiplexing techniques and multiple access techniques.

2. Description of the Related Technology

Multiplexing techniques allow multiple signals to share a single physical channel. Traditional multiplexing techniques include time-division multiplexing (TDM), frequency-division multiplexing (FDM), and code-division multiplexing (CDM). CDM, which multiplexes multiple signals into the same time interval and frequency band by orthogonal codes, requires the original signals to be in the same domain (e.g., time or frequency). In a hybrid system, such as a hybrid orthogonal frequency-division multiplexing (OFDM) and cyclic prefix single carrier (CP-SC) system, the orthogonal signals are transmitted in different domains and traditional CDM cannot be utilized. Multiple access techniques allow signals from multiple users to be transmitted through a single physical medium. Traditional multiple access techniques include time-division multiple access (TDMA), frequency-division multiple access (FDMA) and code-division multiple access (CDMA). As a special case of FDMA, OFDMA (orthogonal frequency-division multiple access) allocates orthogonal sub-carriers among multiple users. In traditional OFDMA systems, a single sub-carrier is the smallest allocable unit which can be allocated to only one user.

SUMMARY OF CERTAIN INVENTIVE ASPECTS

One aspect is a method of multiplexing signals, the method comprising receiving a pulse-amplitude modulated (PAM) orthogonal frequency-division multiplexing (OFDM) signal, the OFDM signal being real in the frequency domain, receiving a quadrature-amplitude modulated (QAM) cyclic-prefix single-carrier (CP-SC) signal, the CP-SC signal being complex in the time domain, inverse transforming the OFDM signal so as to generate an in-phase signal, the in-phase signal being complex in the time domain and real in the frequency domain, concatenating the complex-even and complex-odd portions of the CP-SC signal so as to generate a quadrature signal, the quadrature signal being complex in the time domain and imaginary in the frequency domain, adding the in-phase signal and the quadrature signal so as to generate a multiplexed signal, and transmitting the multiplexed signal.

Another aspect is a method of multiplexing signals, the method comprising receiving a first signal having at least a real component, receiving a second signal having at least a real component, generating an in-phase signal based, at least in part, on the first signal, the in-phase signal being real in a first domain, generating a quadrature signal based, at least in part, on the second signal, the quadrature signal being imaginary in the first domain, adding the in-phase signal and the quadrature signal to generate a multiplexed signal, and transmitting the multiplexed signal.

Another aspect is a method of demultiplexing signals, the method comprising receiving a multiplexed signal, the multiplexed signal comprising an in-phase signal and a quadrature signal, the in-phase signal being real in a first domain and the quadrature signal being imaginary in the first domain, determining a first signal based on the in-phase signal, and determining a second signal based on the quadrature signal.

Yet another aspect is a system for multiplexing signals, the system comprising a receiver configured to receive a first signal having at least a real component and a second signal having at least a real component, an in-phase generator configured to generate an in-phase signal based, at least in part, on the first signal, the in-phase signal being real in a first domain, a quadrature generator configured to generate a quadrature signal based, at least in part, on the second signal, the quadrature signal being imaginary in the first domain, an adder configured to add the in-phase an quadrature signal to generate a multiplexed signal, and a transmitter configured to transmit the multiplexed signal.

Yet another aspect is a system for demultiplexing signals, the system comprising a receiver configured to receive a multiplexed signal, the multiplexed signal comprising an in-phase signal and a quadrature signal, the in-phase signal being real in a first domain and the quadrature signal being imaginary in the first domain, an in-phase demodulator configured to determine a first signal based on the in-phase signal, and a quadrature demodulator configured to determine a second signal based on the quadrature signal.

One aspect is a system for multiplexing signals, the system comprising means for receiving a first signal having at least a real component, means for receiving a second signal having at least a real component, means for generating an in-phase signal based, at least in part, on the first signal, the in-phase signal being real in a first domain, means for generating a quadrature signal based, at least in part, on the second signal, the quadrature signal being imaginary in the first domain, means for adding the in-phase signal and the quadrature signal to generate a multiplexed signal, and means for transmitting the multiplexed signal.

Another aspect is a system for demultiplexing signals, the system comprising means for receiving a multiplexed signal, the multiplexed signal comprising an in-phase signal and a quadrature signal, the in-phase signal being real in a first domain and the quadrature signal being imaginary in the first domain, means for determining a first signal based on the in-phase signal, and means for determining a second signal based on the quadrature signal.

Another aspect is a computer-readable storage medium having instructions encoded thereon which, when executed by one or more processors, performs a method of multiplexing signals, the method comprising receiving a first signal having at least a real component, receiving a second signal having at least a real component, generating an in-phase signal based, at least in part, on the first signal, the in-phase signal being real in a first domain, generating a quadrature signal based, at least in part, on the second signal, the quadrature signal being imaginary in the first domain, adding the in-phase signal and the quadrature signal to generate a multiplexed signal, and transmitting the multiplexed signal.

Yet another aspect is a computer-readable storage medium having instructions encoded thereon which, when executed by one or more processors, performs a method of demultiplexing signals, the method comprising receiving a multiplexed signal, the multiplexed signal comprising an in-phase signal and a quadrature signal, the in-phase signal being real in a first domain and the quadrature signal being imaginary in the first domain, determining a first signal based on the in-phase signal, and determining a second signal based on the quadrature signal.

DETAILED DESCRIPTION OF CERTAIN INVENTIVE EMBODIMENTS

As described above, multiplexing techniques allow multiple signals to share a single physical channel. That is, the multiple signals are multiplexed into a single signal for transmission through the channel. The receiver which receives the multiplexed signal is able to separate at least one of the multiple signals from the multiplexed signal.

Time-division multiplexing (TDM) is a form of multiplexing in which two or more signals are transmitted during different time intervals. The receiver can differentiate between the multiple signals based on the transmission at different times by gating the received signal. Frequency-division multiplexing (FDM) is a form of multiplexing in which two or more signals are transmitted at different frequencies, or using different frequency bands. The receiver can differentiate between the multiple signals based on the transmission at different frequencies by filtering the received signal. Code-division multiplexing (CDM) is a form of multiplexing in which two or more signals are transmitted during the same time interval and at the same frequency. Each of the signals is coded with one of a number of orthogonal codes. The receiver can differentiate between the multiple signals by decoding the signal encoded with a particular orthogonal code.

CDM requires the original signals to be in same domain (e.g., time or frequency). In a hybrid system, such as a system which generates signals which are in the frequency domain, such as orthogonal frequency-division multiplexing (OFDM) signals, and signals which are in the time domain, such as cyclic prefix single carrier (CP-SC) signals, traditional CDM cannot be utilized. Thus, a multiplexing technique for signals in different domains that generates a multiplexed signal such that the original signals occupy the same time interval and frequency band is desirable.

One technique to multiplex different signals into the same time interval and frequency band is signal-space division multiplexing (SSDM). SSDM multiplexes different signals into different signal spaces, such as the in-phase and quadrature paths of a complex constellation. One embodiment of SSDM, called in-phase/quadrature division multiplexing (IQDM) transmits a first signal in the in-phase path in the frequency domain and a second signal in the quadrature path in the frequency domain. In one embodiment, an OFDM signal is transmitted in one of the paths and a CP-SC signal is transmitted in the other.

Figure 1:
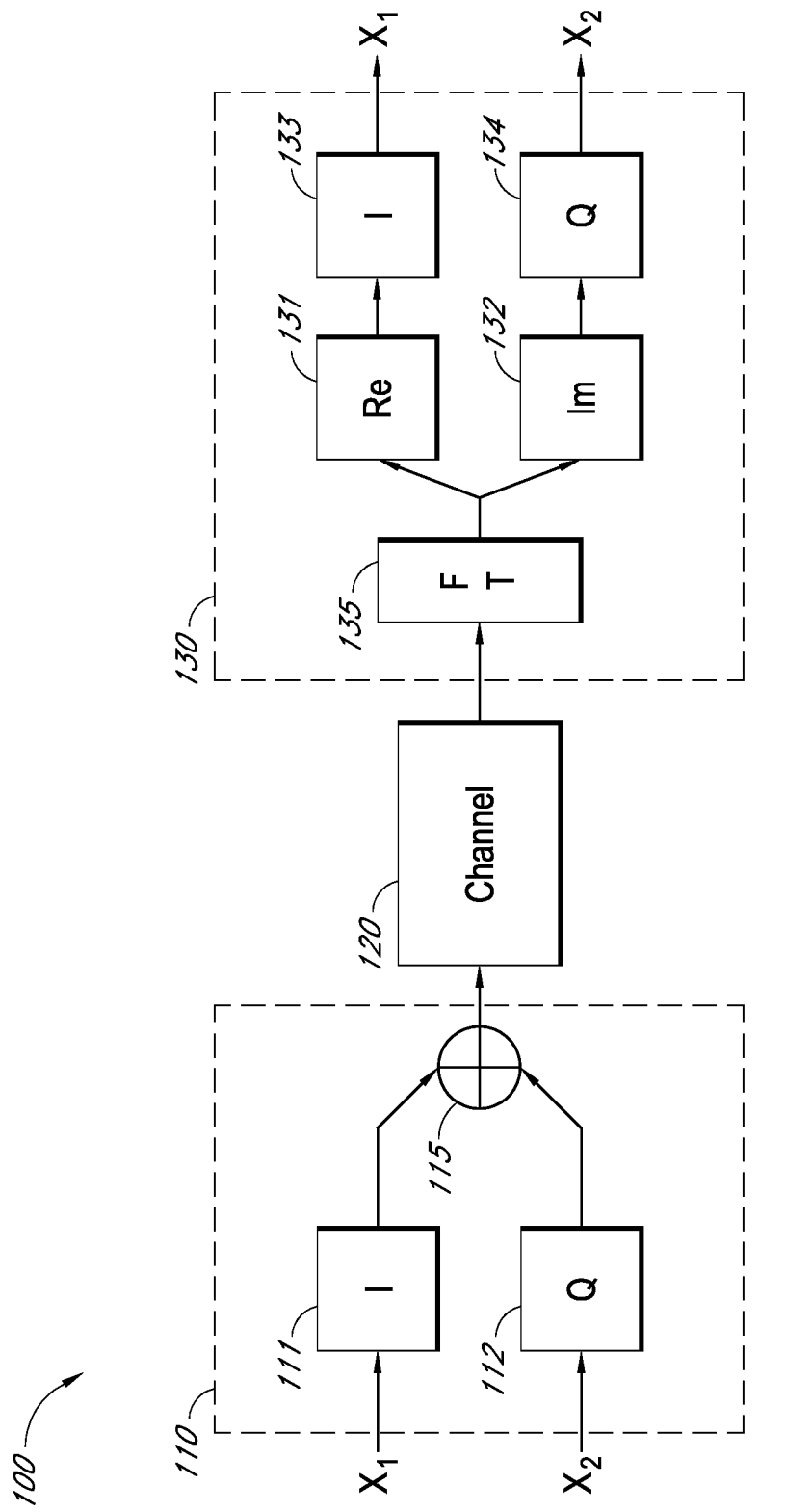
FIG. 1 is a block diagram illustrating a system for transmission and reception of a multiplexed signal.

FIG. 1 is a block diagram illustrating a system for transmission and reception of a multiplexed signal. The system 100 includes a transmitter 110, which transmits a multiplexed signal over a channel 120 to a receiver 130. The transmitter 110 takes, as inputs, two signals, denoted $x_1$ and $x_2$.

The first signal, $x_1$, is input into an in-phase module 111, which generates a first complex time-domain signal, such that the first complex time-domain signal would be real if transformed into the frequency domain. In one embodiment, the first signal is a pulse-amplitude modulated (PAM) OFDM signal, which is real in the frequency domain. Thus, the in-phase module 111 simply performs an inverse Fourier transform on the input signal. In another embodiment, the first signal is a PAM CP-SC signal, which is real in the time domain. Thus, the in-phase module 111 must process the input signal such that the output signal would be real if transformed into the frequency domain.

It will be appreciated by those of skill in the art that a finite discrete signal which is real in the time domain would generally be complex if transformed (via a discrete Fourier transform) into the frequency domain. A signal with even symmetry (denoted an even signal) is a signal $x(n)$ of length N, such that, $x(n)=[x(-n)]_N$, where $[x(n)]_N$ denotes circular shift. An signal with odd symmetry (denoted an odd signal) is a signal such that $x(n)=[-x(-n)]_N$. A signal which is even and real in the time domain would be even and real if transformed into the frequency domain. Similarly, a signal which is even and imaginary in the time domain would be even and imaginary if transformed into the frequency domain. A signal which is odd and real in the time domain would be odd and imaginary if transformed into the frequency domain. Similarly, a signal which is odd and imaginary in the time domain would be odd and real if transformed into the frequency domain. A table of time-frequency transform properties is shown in Table 1.

TABLE 1

| Time-Domain Signal $x(t) = x_R(t) + j * x_I(t)$ | Frequency-Domain Signal $X(f) = X_R(f) + j * X_I(f)$ |
|---|---|
| complex | complex |
| real and even | real and even |
| real and odd | imaginary and odd |
| imaginary and even | imaginary and even |
| imaginary and odd | real and odd |
| even $x_R(t)$, odd $x_I(t)$ | real |
| odd $x_R(t)$, even $x_I(t)$ | imaginary |

The in-phase module 111 outputs a complex time-domain signal which would be real if transformed into the frequency domain. This implies that the output signal has an even real component and an odd imaginary component. Such an output signal can be generated from the input signal by decomposing the real input signal into its even and odd components and rotating the odd component by 90°, e.g. by multiplying by the imaginary unit, j or −j.

A real signal can be decomposed into its even and odd components using the following, where x is the input signal, $x_e$ is the even component, and $x_o$ is the odd component:

$$x_e = \frac{1}{2}(x(n) + [x(-n)]_N), \text{ and} \quad (1)$$

$$x_o = \frac{1}{2}(x(n) - [x(-n)]_N). \quad (2)$$

The in-phase module 111 can therefore receive an input signal which is real in the time-domain and output a complex time-domain signal which would be real if transformed the frequency domain as $x_e+j*x_o$.

The second signal, $x_2$, is input into a quadrature module 112, which generates a second complex time-domain signal, such that the second complex time-domain signal would be imaginary if transformed into the frequency domain. In one embodiment, the second signal is an OFDM signal, which is real in the frequency domain. Thus, the quadrature module rotates the signal by 90°, e.g. by multiplying by the imaginary unit, j or −j and performs an inverse Fourier transform on the input signal. In another embodiment, the second signal is a PAM CP-SC signal, which is real in the time domain. Thus, the quadrature module 112 must process the input signal such that the output signal would be imaginary if transformed into the frequency domain.

For similar reasons as above, such an output signal can be generated from the input signal by decomposing the real input signal into its even and odd components and rotating the even component signal by 90°, e.g. by multiplying by the imaginary unit, j or −j. Thus, the quadrate module 112 can receive an input signal which is real in the time-domain and output a complex time-domain signal which would be imaginary if transformed into the frequency domain as $x_o+j*x_e$.

The output of the in-phase module 111, which is a complex time-domain signal that would be real if transformed into the frequency domain, and the output of the quadrature module 112, which is a complex time-domain signal that would be imaginary if transformed into the frequency domain, are summed together at adder 115. The output of the adder 115 is a complex time-domain signal which would be complex if transformed into the frequency domain. The output of the adder is transmitted from the transmitter 110 via the channel 120 to the receiver 130.

Transmission of a complex time-domain signal can be accomplished by modulating the signal to some carrier frequency and demodulating the signal at the receiver 130. The channel 120 may distort the transmitted signal such that the received signal is a noisy and frequency-selective faded version of the transmitted signal. In the embodiment illustrated in FIG. 1, we assume there is no noise or fading. Thus, the signal received at the receiver 130 is the same as that transmitted at the transmitter 110.

The received signal, like the transmitted signal, is a complex time-domain signal which would be complex if transformed into the frequency domain. A Fourier transform is performed on the received signal at a transform module 135. The output of the transform module is a complex frequency-domain signal. The output of the transform module is input into a real module 131 and an imaginary module 132. The real module 131 outputs the real component of the input signal and discards the imaginary component. Similarly, the imaginary module 132 outputs the imaginary component of the input signal and discards the real component.

The output of the real module 131 is input into an in-phase module 133. The in-phase module 133 of the receiver partially "undoes" the processing performed at the in-phase module 111 of the transmitter. As described above, in one embodiment, the first input signal, $x_1$, is real in the frequency domain. Thus, the output of the real module 131 is a real frequency-domain signal which is identical to the first input signal. In this embodiment, an in-phase module 133 at the receiver is unnecessary.

In another embodiment, the first input signal, $x_1$, is real in the time domain. The in-phase module 111 of the transmitter processes the signal such that it would be real if transformed into the frequency domain, e.g., by outputting $x_e+j*x_o$. Thus, the output of the real module 131 is a real frequency-domain signal equal to the Fourier transform of $x_e+j*x_o$. The in-phase module 133 of the receiver can perform an inverse Fourier transform to generate $x_e+j*x_o$ and combine $x_e$ and $x_o$ to generate the first input signal, $x_1$. This combination can be performed by rotating the imaginary portion of $x_e+j*x_o$ or rotating the odd portion of $x_e+j*x_o$.

The output of the imaginary module 132 is input into a quadrature module 134. The quadrature module 134 of the receiver partially "undoes" the processing performed at the quadrature module 112 of the transmitter. As described above, in one embodiment, the second input signal, $x_2$, is real in the frequency domain. Thus, the output of the imaginary module 132 is an imaginary frequency-domain signal which is identical to the second input signal rotated 90°. In this embodiment, the quadrature module 134 at the receiver rotates the imaginary signal such that it is a real signal equal to the second input signal.

In another embodiment, the second input signal, $x_2$, is real in the time domain. The quadrature module 112 of the transmitter processes the signal such that it would be imaginary if transformed into the frequency domain, e.g., by outputting $x_o+j^*x_e$. Thus, the output of the quadrature module 132 is an imaginary frequency-domain signal equal to the Fourier transform of $x_o+j^*x_e$. The quadrature module 134 of the receiver can perform an inverse Fourier transform to generate $x_o+j^*x_e$, and combine $x_o$ and $x_e$ to generate the first input signal, $x_2$. This combination can be performed by rotating the imaginary portion of $x_o+j^*x_e$ or rotating the even portion of $x_o+j^*x_e$.

The output of the in-phase module 133 at the receiver is the first input signal, $x_1$. Similarly, the output of the quadrature module 134 at the receiver is the second input signal, $x_2$. Thus, the signals have been successfully communicated over the channel 120.

Although the description above has described input signals which are real in the frequency domain (such as a PAM OFDM signal) or real in the time domain (such as a PAM CP-SC signal), the techniques described herein may also be used to transmit signals which are complex in the frequency domain (such as a QAM OFDM signal) or complex in the time domain (such as a QAM CP-SC signal).

It will be appreciated that, generally, a signal which is complex in the time domain would be complex if transformed into the frequency domain. Similarly, a signal which is complex in the frequency domain would be complex if transformed into the time domain. It will be further appreciated that, generally, a signal of length N which is complex in one domain cannot be losslessly represented by a signal of length N which is real (or imaginary) in the other domain. However, a signal of length N/2 which is complex in one domain can be losslessly represented by a signal of length N which is real (or imaginary) in the other domain. Thus, referring once again to FIG. 1, in one embodiment, the first input signal, $x_1$, is a complex frequency-domain signal of length N/2. The output of the in-phase module 111 of the transmitter is a complex time-domain signal of length N which would be real if transformed into the frequency domain.

In one embodiment, the in-phase module 111 interleaves the real component of the input signal and the imaginary component of an input signal of length N/2 to generate a real signal in the frequency domain of length N. The in-phase module 111 performs an inverse Fourier transform on the interleaved signal to produce a complex time-domain signal of length N which would be real if transformed into the frequency domain. Mathematically expressed, the signal input into the in-phase module 111 is $x_1(n)=x_R(n)+j^*x_I(n)$. Thus, in one embodiment, the signal output from the in-phase module 111 is IFT($[x_R(1) x_I(1) x_R(2) x_I(2) \ldots x_R(N/2) x_I(N/2)]$). Thus, the real and imaginary components are, in a sense, time-division multiplexed prior to the inverse Fourier transform.

In another embodiment, the real and imaginary components of the input signal, $x_1$, are concatenated to generate a real signal in the frequency domain of length N. The in-phase module 111 performs an inverse Fourier transform on the concatenated signal to produce a complex time-domain signal of length N which would be real if transformed into the frequency domain. Mathematically expressed, the signal input into the in-phase module 111 is $x_1=x_R+j^*x_I$. In one embodiment, the signal output from the in-phase module 111 is IFT($[x_R x_I]$). Thus, the real and imaginary components are, in a sense, time-division multiplexed with a longer time slot prior to the inverse Fourier transform.

As will be appreciated, there are other methods of combining the real and imaginary components of the input signal. For example, the real and imaginary components can be code-division multiplexed prior to the inverse Fourier transform. In one embodiment, the signal output from the in-phase module 111 is IFT($[x_R(1)+x_I(1) x_R(1)-x_I(1) x_R(2)+x_I(2) x_R(2)-x_I(2) \ldots x_R(N/2)+x_I(N/2) x_R(N/2)-x_I(N/2)]$).

The in-phase module 133 at the receiver 130 receives a real signal of length N equal to the Fourier transform of that output from the in-phase module 111 of the transmitter 110. The in-phase module 133 at the receiver 130 performs deinterleaving, deconcatenating, or decoding of the real signal of length N into a complex signal of length N/2 equal to that of the input signal, $x_1$.

It is to be appreciated that an input signal of length N, which is complex in the frequency domain, can be similarly processed to generate a real signal in the frequency domain of length 2N which can be split in half, each half being separately inverse transformed and transmitted over adjacent symbols.

In another embodiment, the first input signal, $x_1$, is a complex time-domain signal of length N/2. The output of the in-phase module 111 of the transmitter is a complex time-domain signal of length N which would be real if transformed into the frequency domain.

Mathematically expressed, the signal input into the in-phase module 111 is $x_1(n)=x_R(n)+j^*x_I(n)$. The real and imaginary components can be decomposed into even real, odd real, even imaginary, and even real components. Thus, $x_1(n)=x_{Re}(n)+x_{Ro}(n)+j^*x_{Ie}(n)+j^*x_{Io}(n)$.

In one embodiment, the in-phase module 111 treats the real and imaginary components separately. In one embodiment, the real component, $x_R$, a real signal of length N/2, and the imaginary component, $x_I$, a real signal of length N/2, are multiplexed as described above to generate a real signal of length N. For example, the multiplexed signal can, among other things, be:

$[x_R(1) x_I(1) x_R(2) x_I(2) \ldots x_R(N/2) x_I(N/2)]$;

$[x_R x_I]$; or $([x_R(1)+x_I(1)x_R(1)-x_I(1)x_R(2)+x_I(2)x_R(2)-x_I(2) \ldots x_R(N/2)+x_I(N/2)x_R(N/2)-x_I(N/2)]$.

This multiplexed signal, a real signal of length N, can be treated as described above to generate a complex time-domain signal of length N which would be real if transformed into the frequency domain. In particular, the output signal of the in-phase module 111 can be generated from the multiplexed signal by decomposing the real multiplexed signal into its even and odd components and rotating the odd component by 90°, e.g. by multiplying by the imaginary unit, j or −j.

The in-phase module 133 at the receiver 130 receives a real signal of length N equal to the Fourier transform of that output from the in-phase module 111 of the transmitter 110. The in-phase module 133 at the receiver 130 performs detransforming, deinterleaving, deconcatenating, and/or decoding of the real signal of length N into a complex signal of length N/2 equal to that of the input signal, $x_1$.

It is to be appreciated that an input signal of length N, which is complex in the time domain, can be similarly processed to generate a real signal in the time domain of length 2N which can be split in half, each half having its odd component rotated by 90° and transmitted over adjacent symbols.

In another embodiment, the first input signal, $x_1$, is a complex time-domain signal of length N. The output of the in-phase module 111 of the transmitter is two complex time-domain signals of length N which would each be real if transformed into the frequency domain. In one embodiment, the in-phase module 111 treats the real and imaginary components together in the even/odd decomposition. In this embodiment, $$x_{ce} = \frac{1}{2}(x(n) + [x^*(-n)]_N) \quad (3)$$
$$= \frac{1}{2}(x_R(n) + [x_R(-n)]_N + j*(x_I(n) - [x_I(-n)]_N)$$
$$= x_{Re} + j*x_{Io}, \text{ and}$$

$$x_{co} = \frac{1}{2}(x(n) - [x^*(-n)]_N) \quad (4)$$
$$= \frac{1}{2}(x_R(n) - [x_R(-n)]_N + j*(x_I(n) + [x_I(-n)]_N)$$
$$= x_{Ro} + j*x_{Ie}.$$

Note that $x_{ce}$ is a complex time-domain signal of length N which would be real if transformed into the frequency domain. On the other hand, $x_{co}$ is a complex time-domain signal of length N which would be imaginary if transformed into the frequency domain. But, $j*x_{co}$ is a complex time-domain signal of length N which would be real if transformed into the frequency domain. These two signals, $x_{ce}$ and $j*x_{co}$, can be transmitted in adjacent symbols of length N.

The in-phase module 133 at the receiver 130 receives two real signals of length N equal to the Fourier transform of that output from the in-phase module 111 of the transmitter 110. The in-phase module 133 at the receiver 130 performs detransforming, deinterleaving, deconcatenating, and/or decoding of the two received signals of length N into a single complex signal of length N equal to that of the input signal, $x_1$.

In one embodiment, the second input signal, $x_2$, is a complex frequency-domain signal of length N/2. The output of the quadrature module 112 of the transmitter is a complex time-domain signal of length N which would be imaginary if transformed into the frequency domain.

In one embodiment, the quadrature module 112 interleaves and rotates the real component of the input signal and the imaginary component of the signal to generate an imaginary signal in the frequency domain of length N. The quadrature module 112 performs an inverse Fourier transform on the interleaved and rotated signal to produce a complex time-domain signal of length N which would be imaginary if transformed into the frequency domain. Mathematically expressed, the signal input into the quadrature module 112 is $x_2(n)=x_R(n)+j*x_I(n)$. Thus, in one embodiment, the signal output from the quadrature module 112 is IFT($j*[x_R(1) x_I(1) x_R(2) x_I(2) \ldots x_R(N/2) x_I(N/2)]$). Thus, the real and imaginary components are, in a sense, time-division multiplexed and rotated prior to the inverse Fourier transform.

In another embodiment, the real and imaginary components of the input signal, $x_2$, are concatenated and rotated to generate an imaginary signal in the frequency domain of length 2. The quadrature module 112 performs an inverse Fourier transform on the rotated and concatenated signal to produce a complex time-domain signal of length 2 which would be imaginary if transformed into the frequency domain. Mathematically expressed, the signal input into the quadrature module 112 is $x_2=x_R+j*x_I$. In one embodiment, the signal output from the quadrature module 112 is IFT($j*[x_R \; x_I]$). Thus, the real and imaginary components are, in a sense, time-division multiplexed with a longer time slot and rotated prior to the inverse Fourier transform.

As will be appreciated, there are other methods of combining the real and imaginary components of the input signal. For example, the real and imaginary components can be code-division multiplexed and rotated prior to the inverse Fourier transform. In one embodiment, the signal output from the quadrature module 112 is IFT($j*[x_R(1)+x_I(1) \; x_R(1)-x_I(1) \; x_R(2)+x_I(2) \; x_R(2)-x_I(2) \ldots x_R(N/2)+x_I(N/2) \; x_R(N/2)-x_I(N/2)]$).

The quadrature module 134 at the receiver 130 receives an imaginary signal of length N equal to the Fourier transform of that output from the quadrature module 112 of the transmitter 110. The quadrature module 134 at the receiver 130 performs rotation, deinterleaving, deconcatenating, and/or decoding of the imaginary signal of length N into a complex signal of length N/2 equal to that of the input signal, $x_2$.

It is to be appreciated that an input signal of length N, which is complex in the frequency domain, can be similarly processed to generate an imaginary signal in the frequency domain of length 2N which can be split in half, each half being separately inverse transformed and transmitted in adjacent symbols.

In another embodiment, the second input signal, $x_2$, is a complex time-domain signal of length N/2. The output of the quadrature module 112 of the transmitter is a complex time-domain signal of length N which would be imaginary if transformed into the frequency domain.

Mathematically expressed, the signal input into the quadrature module 112 is $x_2(n)=x_R(n)+j*x_I(n)$. The real and imaginary components can be decomposed into even real, odd real, even imaginary, and even real components. Thus, $x_2(n)=x_{Re}(n)+x_{Ro}(n)+j*x_{Ie}(n)+j*x_{Io}(n)$.

In one embodiment, the quadrature module 112 treats the real and imaginary components separately. In one embodiment, the real component, $x_R$, a real signal of length N/2, and the imaginary component, $x_I$, a real signal of length N/2 are multiplexed as described above to generate a real signal of length N. For example, the multiplexed signal can, among other things, be:
[$x_R(1)x_I(1)x_R(2)x_I(2) \ldots x_R(N/2)x_I(N/2)$];
[$x_R x_I$]; or
([$x_R(1)+x_I(1)x_R(1)-x_I(1)x_R(2)+x_I(2)x_R(2)-x_I(2) \ldots x_R(N/2)+x_I(N/2)x_R(N/2)-x_I(N/2)$]).

This multiplexed signal, a real signal of length N, can be treated as described above to generate a complex time-domain signal of length N which would be imaginary if transformed into the frequency domain. In particular, the output signal of the quadrature module 112 can be generated from the multiplexed signal by decomposing the real multiplexed signal into its odd and even components and rotating the even component by 90°, e.g. by multiplying by the imaginary unit, j or −j.

The quadrature module 134 at the receiver 130 receives an imaginary signal of length N equal to the Fourier transform of that output from the quadrature module 111 of the transmitter 110. The quadrature module 133 at the receiver 130 performs rotating, detransforming, deinterleaving, deconcatenating, and/or decoding of the imaginary signal of length N into a complex signal of length N/2 equal to that of the input signal, $x_2$.

It is to be appreciated that an input signal of length N, which is complex in the time domain, can be similarly processed to generate a real signal in the time domain of length 2N which can be split in half, each half having its even component rotated by 90° and transmitted over adjacent symbols.

In another embodiment, the second input signal, $x_2$, is a complex-time domain signal of length N. The output of the quadrature module 112 of the transmitter is two complex time-domain signals of length N which would each be imaginary if transformed into the frequency domain. In one embodiment, the quadrature module 112 treats the real and imaginary components together in the even/odd decomposition. In this embodiment, $$x_{ce} = \frac{1}{2}(x(n) + [x^*(-n)]_N) \quad (5)$$

$$= \frac{1}{2}(x_R(n) + [x_R(-n)]_N + j*(x_I(n) - [x_I(-n)]_N)$$

$$= x_{Re} + j*x_{Io}, \text{ and}$$

$$x_{co} = \frac{1}{2}(x(n) - [x^*(-n)]_N) \quad (6)$$

$$= \frac{1}{2}(x_R(n) - [x_R(-n)]_N + j*(x_I(n) + [x_I(-n)]_N)$$

$$= x_{Ro} + j*x_{Ie}.$$

Note that $x_{ce}$ is a complex time-domain signal of length N which would be real if transformed into the frequency domain. On the other hand, $x_{co}$ is a complex time-domain signal of length N which would be imaginary if transformed into the frequency domain. But, $j*x_{ce}$ is a complex time-domain signal of length N which would be imaginary if transformed into the frequency domain. These two signals, $x_{co}$ and $j*x_{ce}$, can be transmitted in adjacent symbols of length N.

The quadrature module 134 at the receiver 130 receives two imaginary signal of length N equal to the Fourier transform of that output from the quadrature module 112 of the transmitter 110. The quadrature module 134 at the receiver 130 performs rotating, detransforming, deinterleaving, deconcatenating, and/or decoding of the two received signals of length N into a single complex signal of length N equal to that of the input signal, $x_2$.

Described above are methods of converting signals which are real in the frequency domain, real in the time domain, complex in the frequency domain, or complex in the time domain such that the output is either real in the frequency domain or imaginary in the frequency domain. A signal which would be real if transformed into the frequency domain and a signal which would be imaginary if transformed into the frequency domain can be simultaneously transmitted over a channel. Thus, two input signals can be transmitted at the same time over the same frequency band regardless of whether the input signals are real or complex or in the frequency domain or time domain.

It will be appreciated that other signal space multiplexing is envisioned, such as for signals which are imaginary in the time domain or imaginary in the frequency domain. Multiplexing into the real and imaginary parts of the frequency domain have been described above, however, multiplexing can also be performed into the real and imaginary parts of the time domain.

The above multiplexing technique can be used to transmit multiple signals at the same time over the same frequency band. The multiplexing technique can be expanded into a multiple access technique in which different signals from different users are transmitted over the real or imaginary parts of a signal space. Table 2 illustrates various input signals to the in-phase module 111 of the transmitter and exemplary processing performed. In each case, the output of the in-phase module 111 is a complex time-domain signal which would be real if transformed into the frequency domain. Similar processing can be perform by the quadrature module 112 of the transmitter so as to generate a complex-time domain signal which would be imaginary if transformed into the frequency domain.

TABLE 2

| Input Signal | Exemplary Processing |
| --- | --- |
| real frequency-domain signal | IFT |
| imaginary frequency-domain signal | rotation by 90° and IFT |
| complex frequency-domain signal | multiplexing of real component and 90°-rotated version of imaginary component followed by IFT |
| real time-domain signal | rotation of odd component by 90° |
| imaginary time-domain signal | rotation of even component by 90° |
| complex time-domain signal | separate transmission of complex-even component and 90°-rotated version of complex-odd component |

Figure 2:
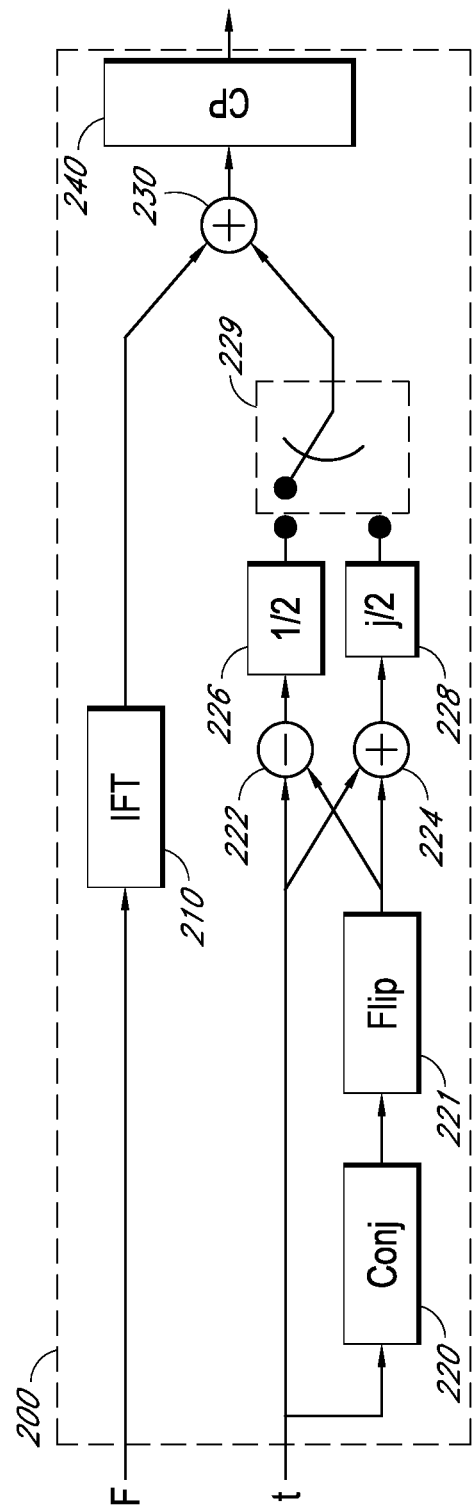
FIG. 2 is a block diagram of an exemplary IQDM transmitter.

Utilizing the multiplexing techniques disclosed herein, one can, for example, transmit a PAM OFDM signal as the first signal, $x_1$, and a QAM CP-SC signal as the second signal, $x_2$. FIG. 2 is a block diagram of an exemplary IQDM transmitter.

The transmitter 200 receives a PAM OFDM signal, F, which is a real frequency-domain signal of length N. The transmitter 200 also receives a QAM CP-SC signal, t, which is a complex time-domain signal of length N. We denote the real and imaginary components of t as $t_R$ and $t_I$, respectively.

The transmitter 200 performs an inverse Fourier transform at inverse transform module 210 which outputs f, the inverse Fourier transform of F. We note that f is a complex, time-domain signal of length N which would be real if transformed into the frequency domain.

The transmitter 200 splits the QAM CP-SC signal, t, into two paths. Along the top path, the signal is t(n), equal to $t_R(n)+j*t_I(n)$ for n=1 to N. On the bottom path, the signal t is input into a conjugate module 220, which outputs t*(n) equal to $t_R(n)-j*t_I(n)$ for n=1 to N. The output of the conjugate module 220 is input into a flipping module 221, which flips the signal, such that the output is t*(N+2−n), equal to $t_R(N+2-n)-j*t_I(N+2-n)$, for n=2 to N; and t*(1), equal to $t_R(1)-j*t_I(1)$, for n=1.

The top path and the bottom path are input into a subtractor 222, the output of which equals t(n)−t*(N+2−n) for n=2 to N, and t(1)−t*(1) for n=1. The output of the subtractor 222 is scaled by a scaler 226 which divides the input by 2. Thus, the output of the subtractor is the conjugate-odd decomposition of the signal, denoted $t_{co}$.

The top path and the bottom path are also input into an adder 224, the output of which equals t(n)+t*(N+2−n) for n=2 to N, and t(1)+t*(1) for n=1. The output of the adder 224 is scaled and rotated by a scaler 228 which divides the input by 2 and rotates the input 90°. Thus the output of the subtractor is the conjugate-even decomposition of the signal, multiplied by j, denoted $j*t_{ce}$.

Both the conjugate-odd and the rotated-conjugate-even signals are input into a multiplexer 229, which alternatively transmits the two signals over adjacent symbols (of length N). Thus, the multiplexer 229 outputs the top path for n=1 to N, and the bottom path for n=N+1 to 2N. The first N points (n=1 to N) and the second N points (n=N+1 to 2N) would each be imaginary if transformed into frequency domain.

The outputs of the inverse transform module 210 and the multiplexer 229 are input into an adder 230, which outputs the sum of the inputs to the adder. A cyclic prefix is added to the signal at cyclic prefix module 240. The output of the cyclic prefix module 240 may be transmitted over a channel.

Figure 3A:
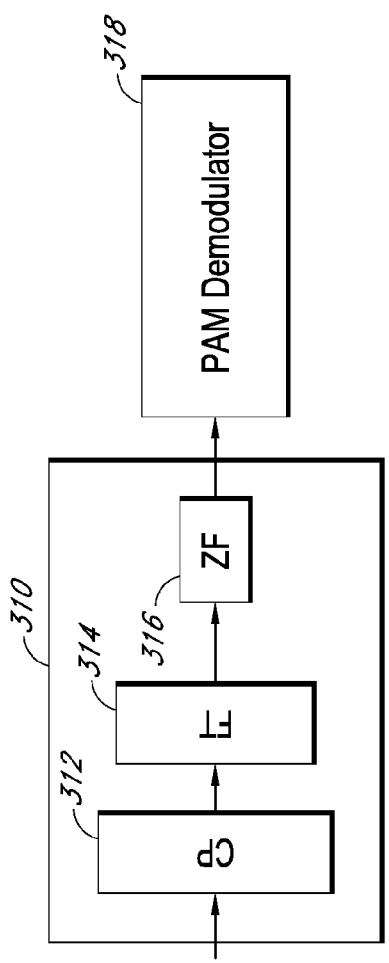
FIG. 3A is a block diagram of an exemplary OFDM receiver.
Figure 3B:
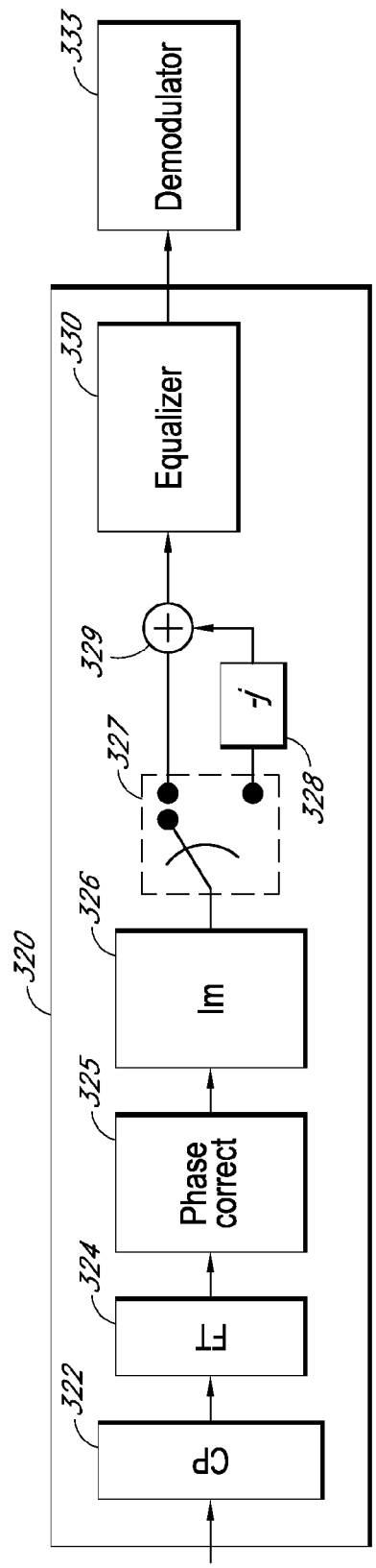
FIG. 3B is a block diagram of an exemplary CP-SC receiver.

FIG. 3A is a block diagram of an exemplary OFDM receiver. FIG. 3B is a block diagram of an exemplary CP-SC receiver. The OFDM receiver 310 inputs the received signal into a cyclic prefix module 312 which removes the cyclic prefix. The output of the cyclic prefix module 312 is input into a transform module 314 which performs a Fourier transform on the signal, converting it into the frequency domain. The output of the transform module 314 is a complex frequency-domain signal, the real part of which corresponds to F and the imaginary part of which corresponds to a processed t. Although, in FIG. 1, the first signal $x_1$ was input into a real module 131 which discarded the imaginary component, this is not always necessary. In the embodiment illustrated in FIGS. 2 and 3, the imaginary component does not affect the PAM demodulation, so can be ignored rather than discarded.

The output of the transform module 314 is input into a zero-forcing (ZF) equalization module 316 which performs ZF equalization. This output can be processed by a PAM demodulator 318 to determine an estimate of the originally transmitted signal. Other receiver configurations could be used. For example, different equalization techniques, included minimum mean-squared error (MMSE) techniques could be used.

The CP-SC receiver 320 inputs the received signal into a cyclic prefix module 322 which removes the cyclic prefix. The output of the cyclic prefix module 322 is input into a transform module 324 which performs a Fourier transform on the signal, converting it into the frequency domain. In some embodiments, the OFDM receiver and CP-SC receiver may be combined and only one CP module 312, 322 and one transform module 314, 324 is used. The output of the transform module 324 is a complex frequency-domain signal, the real part of which corresponds to F and the imaginary part of which corresponds to a processed t. After the channel phase is corrected by phase module 325, the real part of the signal is discarded in imaginary module 326.

The output of the imaginary module 326 is the Fourier transform of the interleaved conjugate-odd and rotated conjugate-even portions of t. This is input into a demultiplexer 327, which separately outputs the Fourier transforms of the conjugate-odd and the rotated conjugate-even portions of t. The Fourier transform of the rotated conjugate-even portion is de-rotated at scaler 328, by a multiplication by –j. The Fourier transforms of the conjugate-odd and conjugate-even portions are summed together at adder 329, which outputs the Fourier transform of t, which can be fed into an equalizer 330 to correct the amplitude of the wireless channel. The result is, perhaps after additional processing, input into a demodulator 333 to determine an estimate of the originally transmitted signal.

Analysis of the transmission and reception of one embodiment of IQDM as described in FIGS. 2 and 3 is described below.

The original PAM-modulated OFDM signal in the nth symbol is denoted $d(n)=[d_0(n),d_2(n), \ldots, d_{N-1}(n)]^T$, whereas the original QAM modulated CP-SC signal for the (2n−1)th and 2nth symbol is denoted $c(n)=[c_0(n),c_2(n), \ldots, c_{N-1}(n)]^T$, where N is the FFT size. The normalized Fourier transform matrix is denoted F. The element at the ith row and kth column of matrix F is $$f_{ik} = \frac{1}{\sqrt{N}} e^{-j2\pi \frac{ik}{N}}, i, k = 0, 1, \ldots, N-1. \quad (7)$$

The time domain OFDM signal is $$x_{OFDM}(n)=F^H d(n) \quad (8)$$

where $(\cdot)^H$ denotes conjugate transpose. The time domain CP-SC signal is $$x_{CPSC}(n) = \begin{cases} \frac{c(\lceil n/2 \rceil) - Dc^*(\lceil n/2 \rceil)}{2} & n \text{ is odd} \\ \frac{c(n/2) + Dc^*(n/2)}{2} \cdot j & n \text{ is even,} \end{cases} \quad (9)$$

where $\lceil x \rceil$ denotes the smallest integer that is not smaller than x, $(\cdot)^*$ denotes conjugate, and D is the flipping matrix, the element at the ith row and kth column of matrix D being $$\{D\}_{ik} = \begin{cases} 1 & i = k = 0 \\ 1 & i = N-k, k = 1, \ldots, N-1. \\ 0 & o.w. \end{cases} \quad (10)$$

The odd indexed symbols transmit the conjugate-odd symmetric portion of the quadrature-amplitude modulation (QAM) modulated CP-SC signal and the even indexed symbols transmit the conjugate-even symmetric portion of the QAM modulated CP-SC signal, which is rotated 90 degree before transmission. If transformed into the frequency domain, the CP-SC signal would be imaginary.

The transmitted time-domain signal is $$x(n)=x_{OFDM}(n)+x_{CPSC}(n). \quad (11)$$

At the receiver, after propagation through the channel, removal of the cyclic prefix, and performance of an FFT (Fast Fourier Transform), the signal is $$r(n)=Hd(n)+HFx_{CPSC}(n)+w(n), \quad (12)$$

where $H=\text{diag}(h_0, h_1, \ldots, h_{N-1})$ is the N×N diagonal matrix containing complex frequency domain channel responses, and w(n) is zero-mean complex Gaussian noise with covariance matrix $\sigma^2 I$, I being the N×N unity matrix. In other systems, the noise may not be Gaussian.

One procedure for detecting the OFDM signal is as follows: perform zero-forcing equalization, and then send the equalized signal to the PAM demodulator. The input to the PAM demodulator is $$\hat{d}(n)=H^{-1}r(n)=d(n)+Fx_{CPSC}(n)+H^{-1}w(n). \quad (13)$$

The DFT of CP-SC signal is in the quadrature path, therefore $Fx_{CPSC}(n)$ is imaginary. Since the OFDM signal is PAM-modulated, $Fx_{CPSC}(n)$ and the imaginary part of $H^{-1}w(n)$ will not affect the PAM demodulator. For the demodulator, $\hat{d}(n)$ is equivalent to $$\tilde{d}(n)=d(n)+Re(H^{-1}w(n)), \quad (14)$$

where $Re(x)=(x+x^*)/2$.

Considering an OFDM system using M-ary QAM modulation and rectangular signal constellations, each sub-carrier convey $K_{OFDM}=\log_2 M$ bits per symbol. In an IQDM system, since half of the bandwidth is used by CP-SC signal, the transmission rate of OFDM signal is expected to be one half of the pure OFDM system, which corresponds to $K_{IQDM}=0.5 \log_2 M$ bits per symbol per sub-carrier and $\sqrt{M}$-ary PAM modulation. For example, if the OFDM system uses 16-QAM modulation, the IQDM system can use 4-PAM modulation. Since we only transmit one half of the bits as compared to the OFDM system, we will use one half of the energy. As shown above, the noise energy is also cut in half, therefore the IQDM system has the same BER performance as pure OFDM systems.

To detect the CP-SC signal, c(n), one can first correct the phase of the channel, discard the real part of the signal, rotate the even indexed symbols by −90 degree, and then combine the (2n−1)th and 2nth symbol. The signal after the processing is $$\hat{c}_f(n) = \text{Imag}\left(\frac{H^*}{|H|}r(2n-1)\right) + \text{Imag}\left(\frac{H^*}{|H|}r(2n)\right) \cdot (-j) \quad (15)$$
$$= |H|Fc + \hat{w}(n),$$

where $\text{Imag}(x) = (x - x^*)/2$, and $$\hat{w}(n) = \text{Imag}\left(\frac{H^*}{|H|}w(2n-1)\right) + \text{Imag}\left(\frac{H^*}{|H|}w(2n)\right) \cdot (-j), \quad (16)$$

$\hat{w}(n)$ is the zero mean complex Gaussian noise with covariance matrix $\sigma^2 I$. After combination, the signal $\hat{c}_f(n)$ is fed to the equalizer. The channel response is denoted |H|.

In a CP-SC system, c(n) is transmitted in the nth symbol (one time faster than IQDM system, but bandwidth efficiency is same). The input to the equalizer for detecting c(n) is $$\tilde{c}_f(n) = HFc(n) + w(n). \quad (17)$$

Statistically, $\hat{w}(n)$ and $w(n)$ are equivalent to each other. Thus, we can expect an IQDM system to have the same BER performance as pure CP-SC systems.

Figure 4:
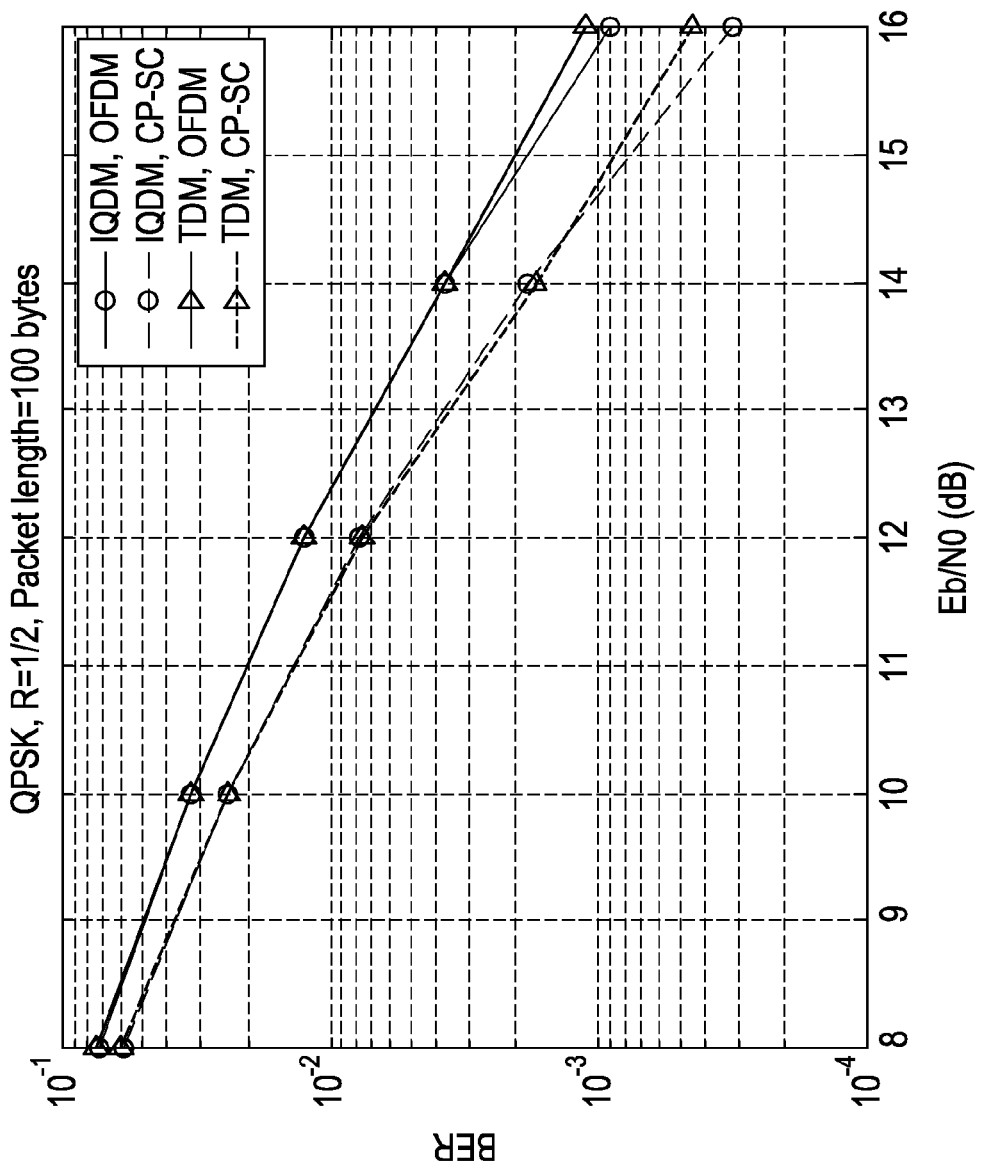
FIG. 4 is a graph showing the results of a simulation comparing the proposed IQDM system with a TDM system.

FIG. 4 is a graph showing the results of a simulation comparing the proposed IQDM system with a TDM system. In the TDM system, OFDM and CP-SC signals are transmitted alternately. The channel is a time-invariant, frequency-selective channel. The power profile of the multi-path channel is [0, −5.4, −14.0, −22.5, −31.1, −12.5, −15.6, −18.7, −21.8000] (dB). The FFT length, N, is 64, the CP length is 16, and the sampling frequency is 20 MHz. As can be seen below, the proposed IQDM system has the same performance as TDM system. In the simulation, quadrature phase-shift keying (QPSK) modulation was used, the coding rate was 1/2, and perfect channel estimation was assumed.

Figure 5:
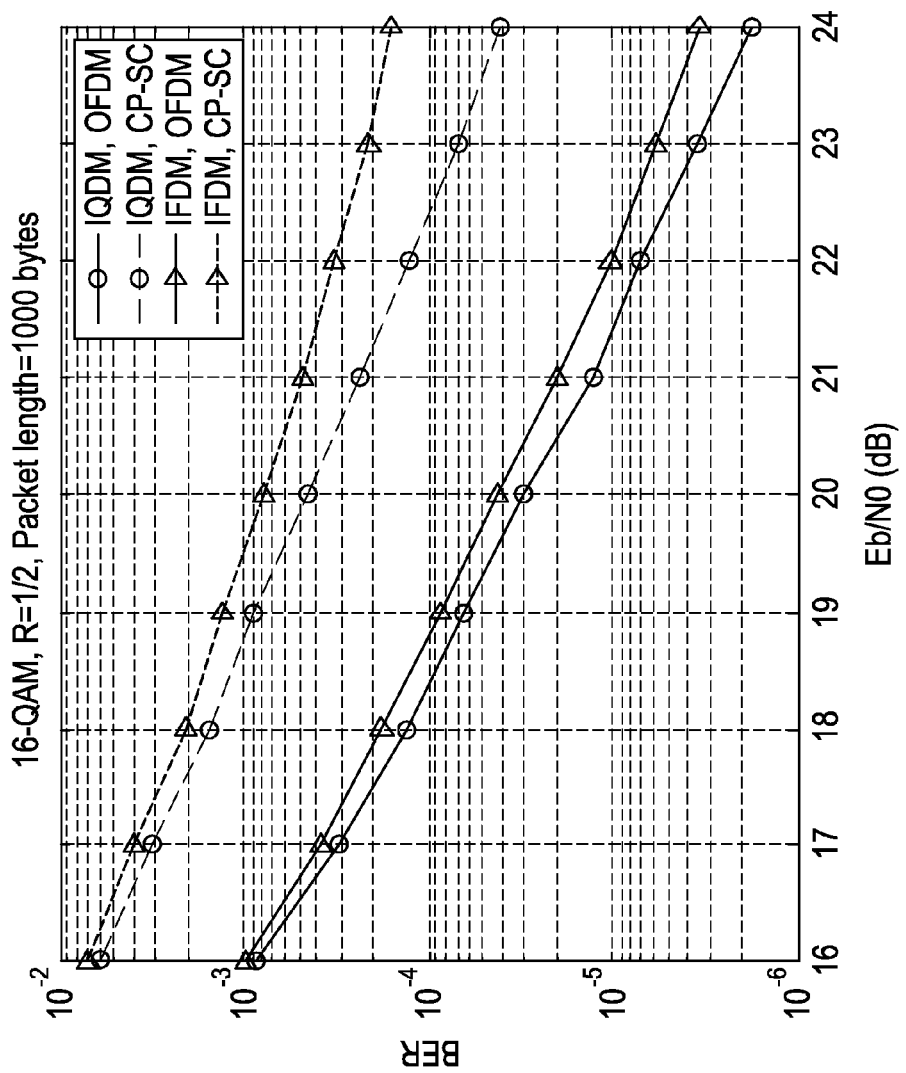
FIG. 5 is a graph showing the results of a simulation illustrating the frequency diversity gain of IQDM over interleaved frequency division multiplexing (IFDM) using a 16-QAM constellation.
Figure 6:
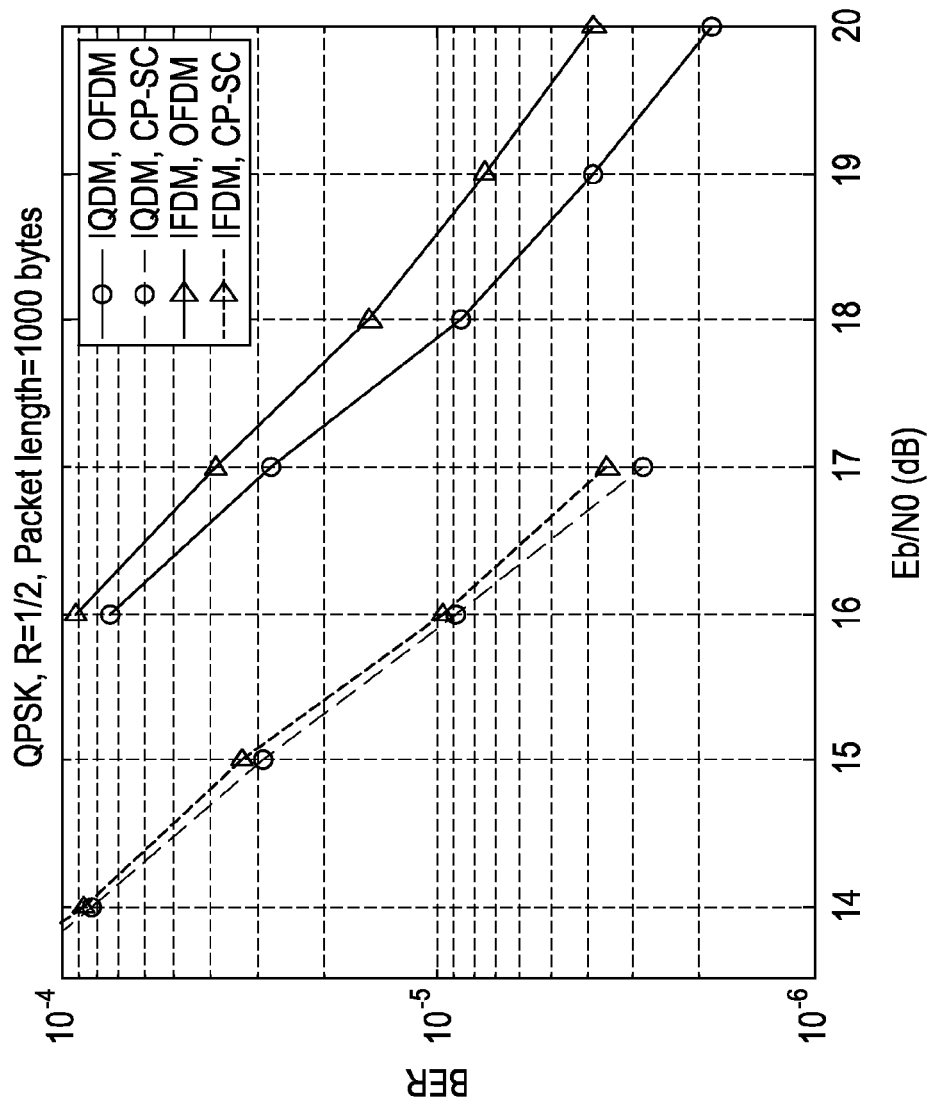
FIG. 6 is a graph showing the results of a simulation illustrating the frequency diversity gain of IQDM over IFDM using a QPSK constellation and a packet length of 1000 bytes.
Figure 7:
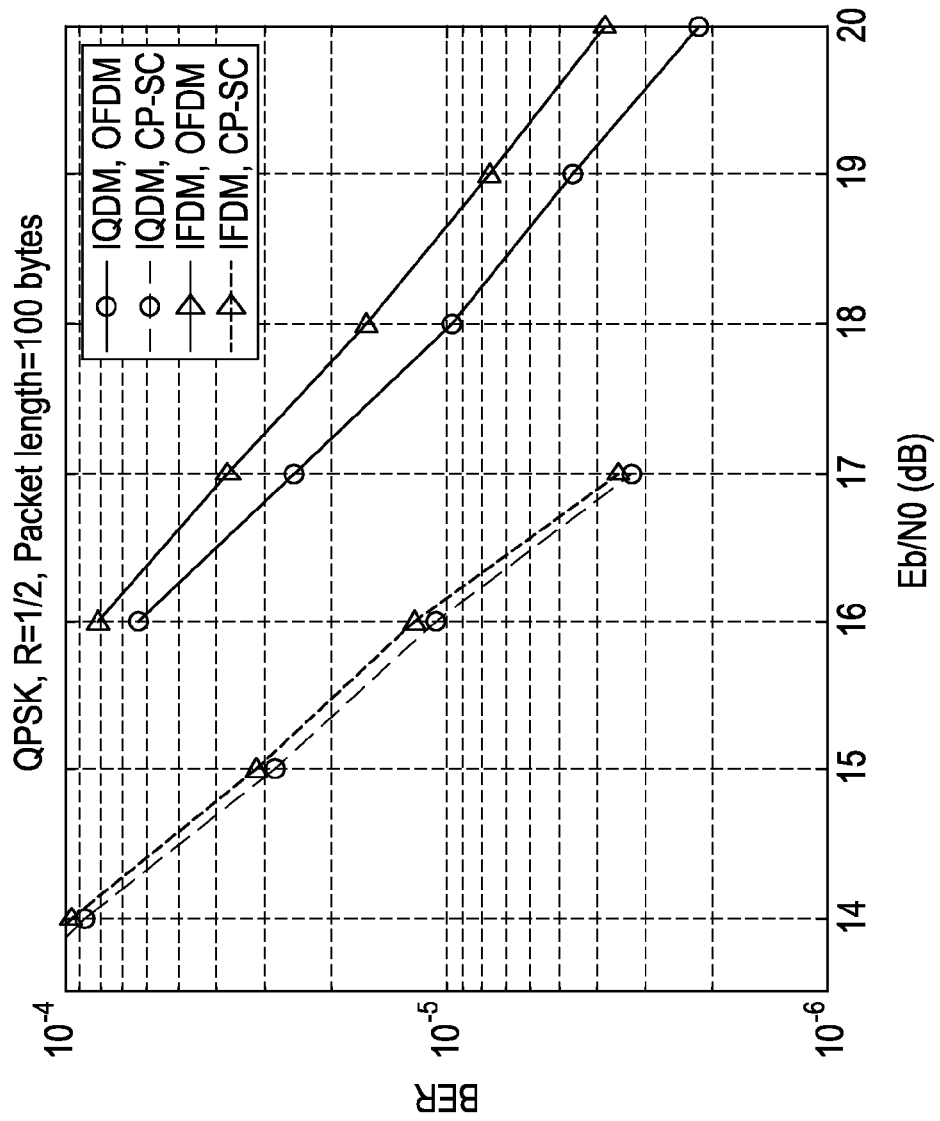
FIG. 7 is a graph showing the results of a simulation illustrating the frequency diversity gain of IQDM over IFDM using a QPSK constellation and a packet length of 100 bytes.

FIGS. 5 through 7 are graphs showing the results of a simulation illustrating the frequency diversity gain of IQDM over interleaved frequency division multiplexing (IFDM) in highly dispersive channels. The root-mean-squared (RMS) delay is 150 ns. For a 16-QAM modulation with packet length 1000 bytes, diversity gain can be found in both OFDM and CP-SC signals. For QPSK modulation, the BER performances of CP-SC signals of the two systems are comparable, while diversity gain can be found over OFDM signals.

Figure 8:
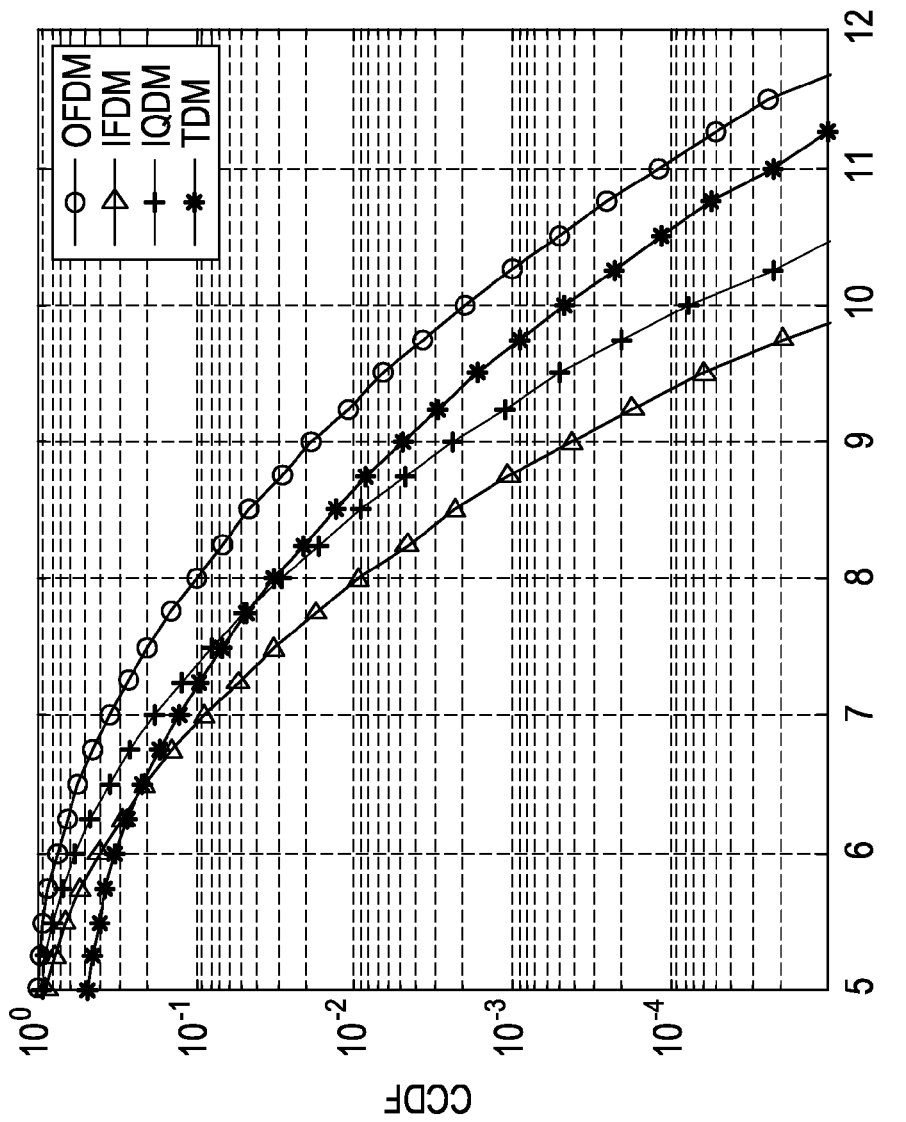
FIG. 8 is a graph showing the results of a simulation comparing the peak-to-average power ratio (PAPR) distribution of OFDM, IFDM, TDM, and IQDM systems.

FIG. 8 is a graph showing the results of a simulation comparing the peak-to-average power ratio (PAPR) distribution of IFDM, TDM, and IQDM systems. The PAPR of a pure OFDM system is also plotted for comparison. For small outage probability, the PAPR of IQDM system is smaller than the TDM system but larger than the IFDM system.

Figure 9:
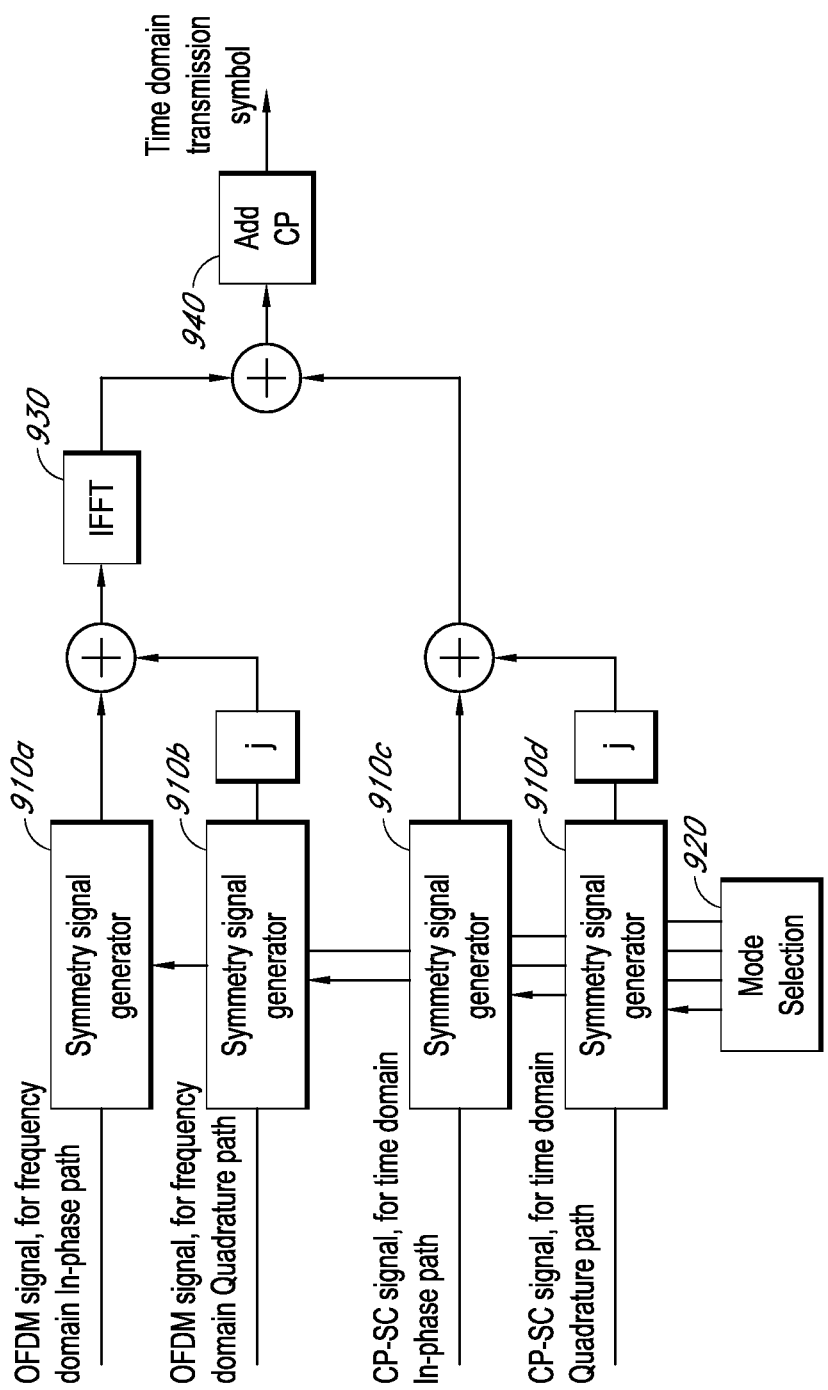
FIG. 9 is a block diagram of an exemplary SSDM transmitter.

As described above, embodiments disclosed herein allow multiplexing of signals which are real in the frequency domain, real in the time domain, complex in the frequency domain, or complex in the time domain. FIG. 9 is a block diagram of an exemplary SSDM transmitter. The inputs to the system are four real signals. For example, the inputs can be the real portion of a frequency-domain signal, the imaginary portion of a frequency-domain signal, the real portion of a time-domain signal, or the imaginary portion of time-domain signal. Each of the signals is fed into a symmetry signal generating (SSG) module 910a, 910b, 910c, 910d. The SSG modules 910 are controlled by a mode selection module 920, which determines the functionality of the SSG modules 910.

The mode selection module 920 selects one mode from at least four modes for each SSG module 910a, 910b, 910c, 910d. In the description follow, the digits 0 through 3 are used to represent the modes selectable by the mode selection module 920. The digit '0' is used to represent an all-zeros signal and the digit '1' is used to represent an arbitrary signal. An arbitrary signal can be evenly symmetric, oddly symmetric, or asymmetric. The digit '2' is used to represent a signal with even symmetry, and the digit '3' is used to represent a signal with odd symmetry.

It will be appreciated that the all-zeros signal is orthogonal to all other signals, an arbitrary signal is orthogonal, at least, to the all-zeros signal, an evenly symmetric signal is orthogonal, at least, to an oddly symmetric signal, and an oddly symmetric signal is orthogonal, at least, to an evenly symmetric signal. Due to the properties of the Fourier transform, if two signals are orthogonal to each other in one domain (frequency or time), they are orthogonal to each other in the other domain.

One embodiment of SSDM multiplexes a complex frequency-domain signal and a complex time-domain signal. Each entry in the table below represents a different signal mode of this embodiment. Each signal mode contains four digits, representing the real part of the original frequency-domain signal, the imaginary part of the frequency-domain signal, the real part of the time-domain signal, and the imaginary part of the time-domain signal.

TABLE 3

| Category | Signal Mode | Description |
| --- | --- | --- |
| 1 | {1032}, {0123}, {1100}, {0011} | Frequency-domain and time-domain signals separated |
| 2 | {2031}, {3012}, {0321}, {0213}, {1302}, {2103}, {1230}, {3120} | Frequency-domain and time-domain signals mixed in one path |
| 3 | {2233}, {3322}, {3210}, {2310} | Frequency-domain and time-domain signals mixed in two paths |

Table 3 does not contain all the possible signal modes. For example, other modes can be obtained from the listed modes by (1) substituting '1' with either '0', '2', or '3'; (2) substituting '2' with '0'; and/or (3) substituting '3' with '0'. The substitution has the potential to reduce bandwidth efficiency (supposing the modulation order is unchanged). For example, substituting '1' with '2' or '3' reduces the data rate in half, while the signal still occupies the same bandwidth.

The signal modes can be categorized by their separations in the frequency domain. For category one, the frequency-domain and time-domain signals are separated into the two paths. Each path (in-phase or quadrature) contains either the frequency-domain or time-domain signal. The first two modes {1032} and {0123} have been described above. The last two modes {1100} and {0011} represent pure frequency-domain and pure time-domain systems. In the second category, the frequency-domain and time-domain signals are mixed in only one path, either the in-phase or quadrature path. In the third category, they are mixed in both of the two paths.

Figure 10A:
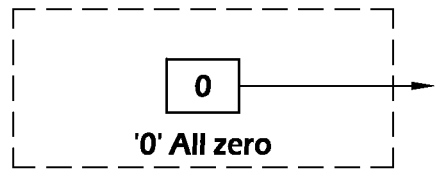
FIG. 10A is a block diagram of an exemplary SSG module for mode '0', an all zeros signal.
Figure 10B:
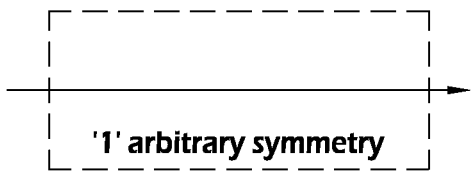
FIG. 10B is a block diagram of an exemplary SSG module for mode '1', an arbitrary signal.

FIGS. 10A, 10B, 10C, and 10D are block diagrams of exemplary SSG modules configured into specific modes. FIG. 10A is a block diagram of an exemplary SSG module for mode '0', an all zeros signal. The SSG module in mode '0' ignores or does not receive the input data. The output contains N zeros. FIG. 10B is a block diagram of an exemplary SSG module for mode '1', an arbitrary signal. The SSG module in mode '1' outputs the input signal.

Figure 10C:
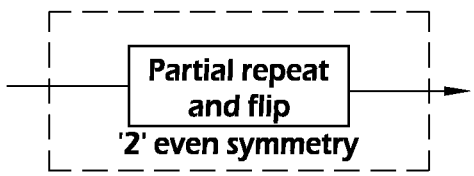
FIG. 10C is a block diagram of an exemplary SSG module for mode '2', an even signal.

FIG. 10C is a block diagram of an exemplary SSG module for mode '2', an even signal. The SSG module in mode '2' outputs an even signal based on the input signal. Those skilled in the art will recognize that an even signal can be generated based on the input signal in a number of different ways. In one embodiment, the input is a vector of N/2+1 input symbols, where N is even, and the output is a vector of N symbols. For example, if the input symbols are $x_0, x_1, x_2, \ldots, x_{N/2-1}, x_{N/2}$, the output symbols may be $x_0, x_1, x_2, \ldots, x_{N/2-1}, x_{N/2}$, $x_{N/2-1}, \ldots, x_2, x_1$. As another example, the output symbols for the same input may be $x_{N/2}, x_{N/2-1}, \ldots, x_2, x_1, x_0, x_1, x_2, \ldots, x_{N/2-1}, x_{N/2-1}$. In another embodiment, the input is a vector of (N+1)/2 input symbols, where N is odd, and the output is a vector of N symbols. For example, if the input symbols are $x_0, x_1, x_2, \ldots, x_{(N+1)/2-2}, x_{(N+1)/2-1}$, the output symbols for the input described above may be $x_0, x_1, x_2, \ldots, x_{(N+1)/2-2}, x_{(N+1)/2-1}, x_{(N+1)/2-1}, x_{(N+1)/2-2}, \ldots, x_1$ or $x_{(N+1)/2-1}, x_{(N+1)/2-2}, \ldots, x_1, x_0, x_0, x_1, x_2, \ldots, x_{(N+1)/2-2}$.

Figure 10D:
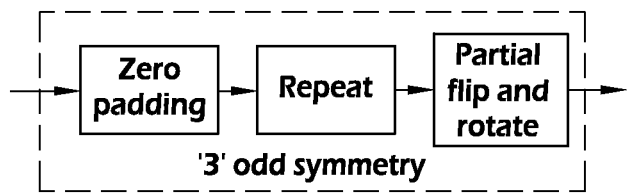
FIG. 10D is a block diagram of an exemplary SSG module for mode '3', an odd signal.

FIG. 10D is a block diagram of an exemplary SSG module for mode '3', an odd signal. The SSG module in mode '3' outputs an odd signal based on the input signal. Those skilled in the art will recognize that an odd signal can be generated based on the input signal in a number of different ways. In one embodiment, the input is a vector of N/2 input symbols and the output is a vector of N+1 symbols. For example, if the input symbols are $x_1, x_2, \ldots, x_{N/2-1}, x_{N/2}$, the output symbols may be $0, x_1, x_2, \ldots, x_{N/2-1}, x_{N/2}, -x_{N/2}, -x_{N/2-1}, \ldots, -x_2, -x_1$. As another example, the output symbols for the same input may be $0, -x_{N/2}, -x_{N/2-1}, \ldots, -x_2, -x_1, x_1, x_2, \ldots, x_{N/2-1}, x_{N/2}$. In another embodiment, the input is a vector of N/2 input symbols and the output is a vector of N+2 symbols. For example, the output symbols for the input described above may be $0, x_1, x_2, \ldots, x_{N/2-1}, x_{N/2}, 0, -x_{N/2}, -x_{N/2-1}, \ldots, -x_2, -x_1$ or $0, -x_{N/2}, -x_{N/2-1}, \ldots, -x_2, -x_1, 0, x_1, x_2, \ldots, x_{N/2-1}, x_{N/2}$.

Figure 11:
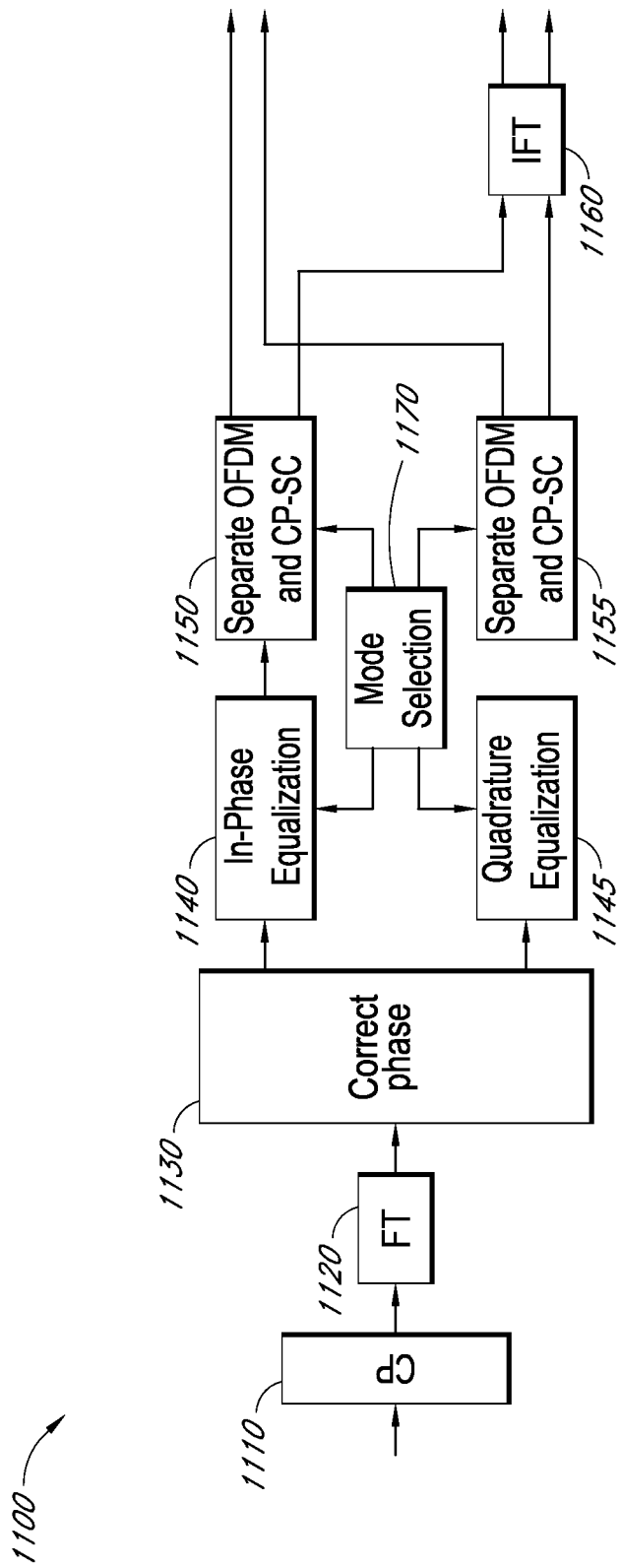
FIG. 11 is a functional block diagram of an exemplary SSDM receiver.

FIG. 11 is a functional block diagram of an exemplary SSDM receiver. The receiver 1100 inputs the received signal into a cyclic prefix removing module 1110 where the cyclic prefix is removed. The output of this module is input into a transform module 1120 which transforms the received signal into the frequency domain. The phase of the channel is corrected in the channel phase correction module 1130, which may perform channel estimation for each sub-carrier. The in-phase portion of the signal and quadrature portion of the signal are separately equalized in in-phase equalizer 1140 and quadrature equalizer 1145. The equalization methods can be different for the two paths and depend on the signal mode. For example, if one path is occupied only by an OFDM signal and zero-forcing (ZF) equalization may be sufficient. Otherwise, if the path is occupied only by a CP-SC signal or contains both OFDM and CP-SC signals, more complicated equalization methods, such as minimum mean-squared error (MMSE) can be applied. The OFDM and CP-SC are separated from each output of the equalizers 1140, 1145 at separation modules 1150, 1155. The OFDM portions are output to an OFDM demodulator and the CP-SC portions are output into an inverse transform module 1160 before being output to a CP-SC demodulator. The equalizers 1140, 1145 and the separation modules 1150, 1155 are controlled by a module selection module 1170 which matches the equalizers 1140, 1145 and separation modules 1150, 1155 to the mode selected by the transmitter.

The SSG module illustrated in FIG. 10C is capable of producing an even signal of length N−1, N, or N+1, whereas the illustrated SSG module of FIG. 10D is capable of producing an odd signal of length N or N+1. This structure has some disadvantages:

1. The input data rates are unequal.

2. In some signal modes, OFDM or CP-SC signals occupy two paths. In some embodiments, it is desirable to treat the signals in the two paths as one complex modulated symbol rather than two PAM-modulated symbols. If the two paths are in the mode '32' or '23', it is not easy to combine the two paths and treat them as complex symbols.

3. The MMSE equalizer for CP-SC signal is complicated due to partial flip. Consider an evenly symmetric CP-SC signal generated from $X_{in2}$. In one embodiment, the output of the signal generator can be rewritten as $$x_{out2} = D_2 x_{in2}, \quad (18)$$

where $D_2$ is the N×(N/2+1) partial repeat and rotation matrix, the element at the ith row and kth column of matrix $D_2$ is $$\{D_2\}_{ik} = \begin{cases} 1 & k = i, i = 0, \ldots, N/2 \\ 1 & k = N - i, i = N/2+1, \ldots, N-1. \\ 0 & o.w. \end{cases} \quad (19)$$

Substituting $x_{CPSC}(n)$ in (12) with $x_{out2}$ and neglecting the first item (OFDM signal) and the time index n, one can write $$r = HFx_{out2} + w = HFD_2 x_{in2} + w, \quad (20)$$

Denoting an N×1 vector $a_m$ for the MMSE weights for demodulating $x_{2m}$, $m \in [0, \ldots, N/2]$, the mean squared error is $$J_{MSE} = E[a_m^T HFD_2 x_{in2} + a_m^T w - x_{2m}) \quad (21)$$
$$(a_m^T HFD_2 x_{in2} + a_m^T w - x_{2m})^H]$$
$$= a_m^T HFD_2 E(x_{in2} x_{in2}^H) D_2^H F^H H^H a_m^* +$$
$$a_m^T E(ww^H) a_m^* + E(|x_{2m}|^2) - a_m^T HFD_2 E(x_{in2} x_{2m}^*) -$$
$$E(x_{2m} x_{in2}^H) D_2^H F^H H^H a_m^*.$$

Assuming the input modulated symbols are independent and identically distributed (i.i.d.) and $E(x_{in2} x_{in2}^H) = E_S I$, where $E_S$ is symbol energy, $$J_{MSE} = E_s a_m^T HFD_2 D_2^H F^H H^H a_m^* + \sigma^2 a_m^T a_m^* + E_S - E_s a_m^T HFD_2 e_m - E_S e_m^T D_2^H F^H H^H a_m^*, \quad (22)$$

where $e_m = [e_0, e_1, \ldots, e_{N/2}]^T$ is the (N/2+1)×1 vector with $e_m = 1$, $e_i = 0$, $i \neq m$. Taking the partial derivative with respect to $a_m^*$ and set the result to zero, we obtain the function for $a_m$ $$\frac{\partial J_{MSE}}{\partial a_m^*} = E_S a_m^T HFD_2 D_2^H F^H H^H + \sigma^2 a_m^T - E_S e_m^T D_2^H F^H H^H \quad (23)$$
$$= 0,$$

and $$a_m^T = e_m^T D_2^H F^H H^H \left( HFD_2 D_2^H F^H H^H + \frac{\sigma^2}{E_S} I \right)^{-1}. \quad (24)$$

The matrix product $D_2 D_2^H$ is not Toeplitz. Therefore product $FD_2 D_2^H F^H$ is not diagonal. And the inverse of matrix $$\left( HFD_2 D_2^H F^H H^H + \frac{\sigma^2}{E_S} I \right)$$

can not be easily calculated comparing to diagonal matrix $$\left( HFF^H H_S^H + \frac{\sigma^2}{E} I \right).$$

Figure 12:
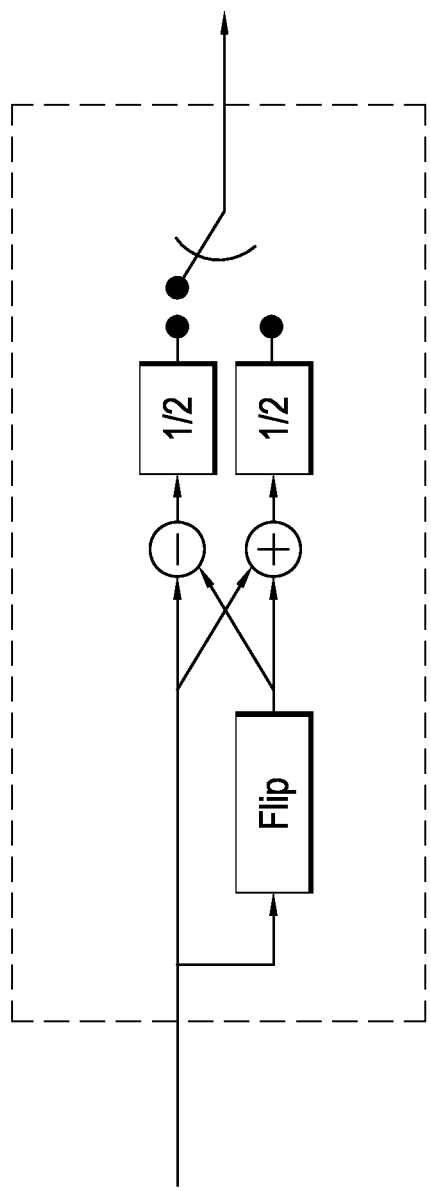
FIG. 12 is a functional block diagram of an exemplary combined evenly and oddly symmetric signal generator.

To address the above mentioned disadvantages, another combined evenly and oddly symmetric signal generating module has been designed. FIG. 12 is a functional block diagram of an exemplary combined evenly and oddly symmetric signal generator. The combined symmetric signal generator outputs the oddly symmetric and evenly symmetric portion of the input signal, alternatively. Both the input and output signal contains N modulated symbols.

Figure 13:
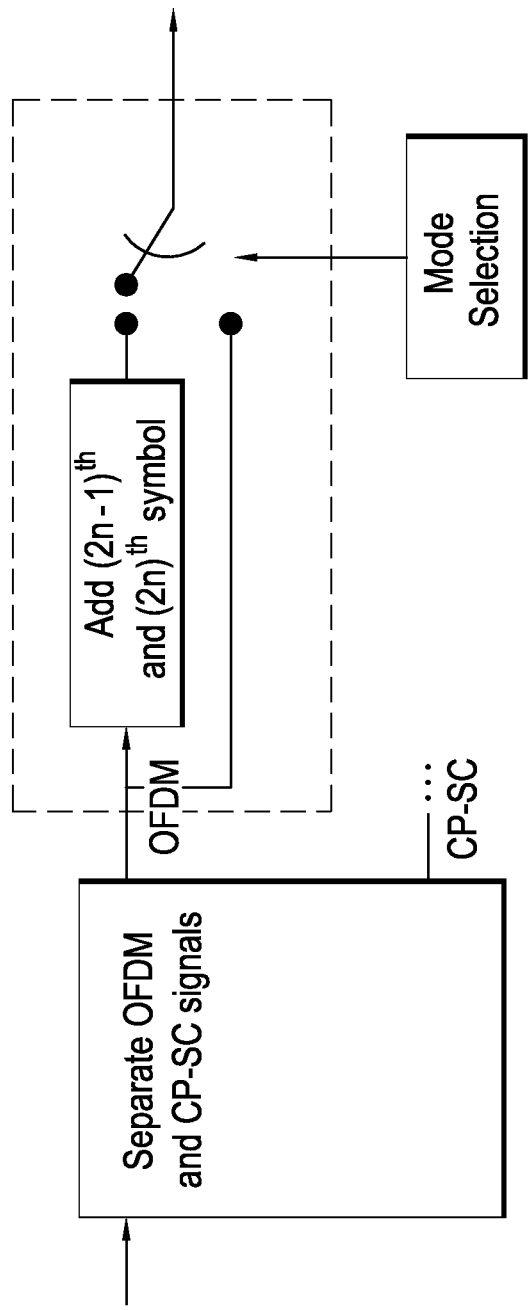
FIG. 13 is an exemplary summation module for one path of OFDM signal.

For signal modes including {1032}, {0123}, {3210} and {2310}, one can use the bottom path (t path) of FIG. 2 as the symmetric signal generator, which accommodates complex input signals. For other signal modes except for {1100} and {0011}, one can use the combined SSG module FIG. 12 as the symmetric signal generator, to transmit symbols with conjugate signal modes in adjacent symbols, e.g. the even symbols use mode {2031}, the odd symbols use mode {3012}. The conjugate signal mode pairs are listed in Table 4. At the receiver, the signals from adjacent conjugate symbols are summed together for signal paths with mode '2' and '3'. The summation for an OFDM signal is performed in the frequency domain. For a CP-SC signal, if both of the two paths need the summation module, they can be performed in either frequency domain or time domain. Otherwise the summation is performed in the time domain (between an IFFT and demodulator). FIG. 13 is an exemplary summation module for one path of OFDM signal. In one embodiment, OFDM and CP-SC signals are separated in the in-phase and quadrature paths. In this case, the summation module can be implemented before the equalization module. After summation, only the original signals and noise remain, as demonstrated above.

TABLE 4

| {2031}, {3012} |
| {0321}, {0213} |
| {1302}, {2103} |
| {1230}, {3120} |
| {3322}, {2233} |

Figure 14:
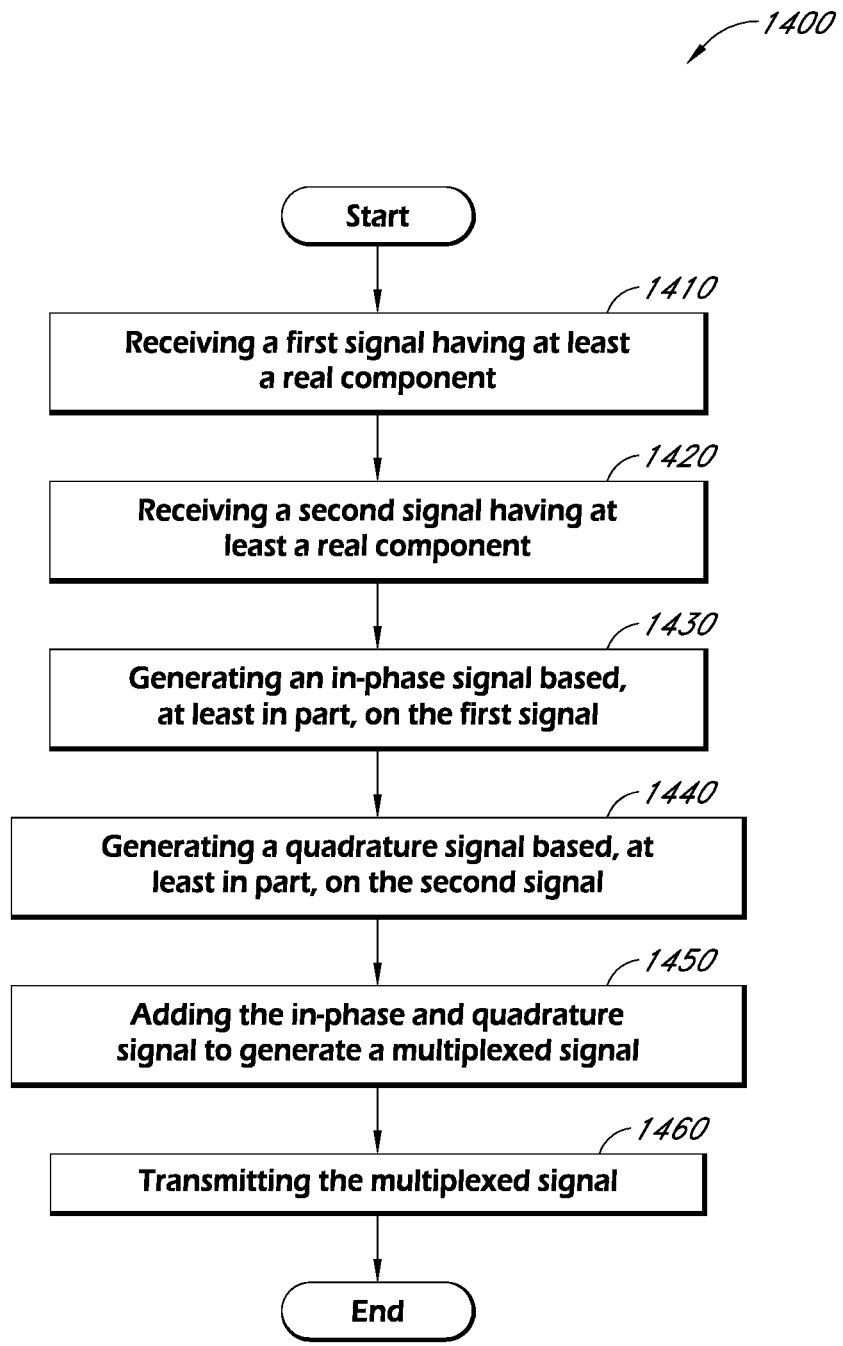
FIG. 14 is a flowchart of a process for transmitting a multiplexed signal.

FIG. 14 is a flowchart of a process for transmitting a multiplexed signal. The process 1400 begins at block 1410, where a first signal is received. The first signal has at least a real component and may also have an imaginary component. Thus, the first signal is either real or complex. The first signal may be in the time domain or the frequency domain. The first signal can be received by the transmitter 110 of FIG. 1. The first signal can be received over a wired or wireless link, or it may be generated within a device of which the transmitter 110 is a component. In one embodiment, the first signal is a pulse-amplitude modulated (PAM) orthogonal frequency-division multiplexing (OFDM) signal which is real in the frequency domain.

Next, in block 1420, a second signal is received. Like the first signal, the second signal is either real or complex and may be in the time domain or the frequency domain. The second signal can similarly be received by the transmitter 110 of FIG. 1 and can be received over a wired or wireless link or be generated within a device of which the transmitter 110 is a component. In one embodiment, the second signal is a CP-SC signal which is real in the time domain. Thus, although both the first signal and second signal have real components, it is unnecessary that the signals have real components in the same domain.

Although blocks 1410 and 1420 are described sequentially, it is to be appreciated that the two blocks may be performed simultaneously, overlapping in time, or in reverse order. Similarly, block 1430 and 1440 are described below sequentially, but it is to be appreciated that the two blocks may be performed simultaneously, overlapping in time, or in reverse order.

Next, in block 1430, an in-phase signal based, at least in part, on the first signal is generated. The in-phase signal may be generated by the in-phase module 111 of FIG. 1. The in-phase signal is real in a first domain, which can be either the time-domain or the frequency-domain, or at least the in-phase signal would be real if transformed into the first domain. In one embodiment, the in-phase signal is generated by inverse Fourier transforming a received PAM OFDM signal. The in-phase signal is thus a complex time-domain signal which would be real if transformed into the frequency domain. Thus, although the in-phase signal is real in a first domain, the in-phase signal need not be in that domain.

In block 1440, a quadrature signal based, at least in part, on the second signal is generated. The quadrature signal may be generated by the quadrature module 112 of FIG. 1. The quadrature signal is imaginary in the first domain, or at least would be imaginary if transformed into the first domain. As noted above, the quadrature signal need not be in first domain, but is preferably in the same domain as the in-phase signal. In one embodiment, the quadrature signal is generated by decomposing a CP-SC signal into a complex-odd component and a complex-even component, rotating the complex-even component, and multiplexing the complex-odd component and the 90-degree-rotated version of the complex-even component.

Continuing, in block 1450, the in-phase and quadrature signals are added together to generate a multiplexed signal. The adding can be performed by the adder 115 of FIG. 1. As the in-phase signal is real in a first domain (or would be if transformed) and the quadrature signal is imaginary in the first domain (or would be if transformed), the multiplexed signal comprising the sum of the in-phase signal and the quadrature signal is complex in the first domain (or would be if transformed).

Finally, in block 1460, the complex multiplexed signal is transmitted. The transmitter 110 of FIG. 1 can perform the transmission of the multiplexed signal. Transmission of a complex signal can be accomplished by modulating the signal with a carrier frequency larger than half the bandwidth of the multiplexed signal.

Although the above description related to multiplexing techniques, the systems and methods described above can also be used in multiple access techniques in which signals from multiple users are multiplexed and transmitted.

In particular, one aspect is an OFDMA-based multiple access technique which allows a single OFDM subcarrier to be shared by two users. In one embodiment, the signals from two users can be respectively transmitted through the in-phase and quadrature paths of the allocated sub-carrier.

Interleaved OFDMA (I-OFDMA) is an OFDM-based multiple access technique where signals from multiple users are transmitted on different subcarriers. One aspect of the development is In-phase/Quadrature (IQ-OFDMA), another OFDM-based multiple access technique where signals from multiple users are transmitted on different subcarriers. I-OFDMA assigns each subcarrier to only one user. In contrast, IQ-OFDMA can be used to assign a single subcarrier to two users. The signals from the two users can be respectively transmitted through the in-phase and quadrature paths of the subcarrier. IQ-OFDMA utilizes the orthogonality between the in-phase and the quadrature paths, as well as the orthogonality among subcarriers, to separate multiple signals from users, whereas I-OFDMA utilizes only orthogonality among subcarriers to separate multiple signals from users.

IQ-OFDMA systems can provide more frequency diversity than I-OFDMA systems. In IQ-OFDMA systems, each subcarrier is assigned to two users, where one occupies the in-phase path and the other occupies the quadrature path. Therefore, an IQ-OFDMA system can provide an additional dimension of subcarriers to each user compared to I-OFDMA systems.

Figure 15:
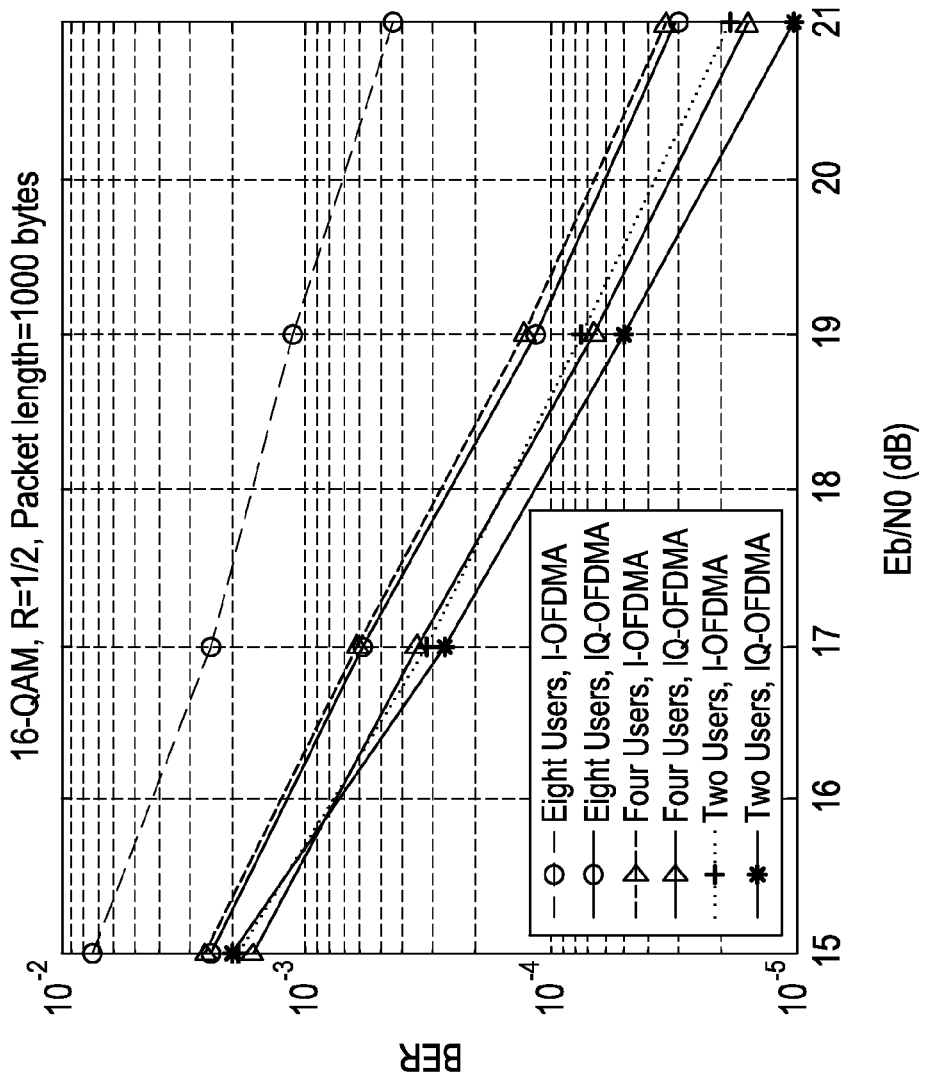
FIG. 15 is a graph showing the results of a simulation comparing the bit error rate (BER) performance of IQ-OFDMA and I-OFDMA system in which all users transmit an OFDM signal having a packet length of 1000 bytes.
Figure 16:
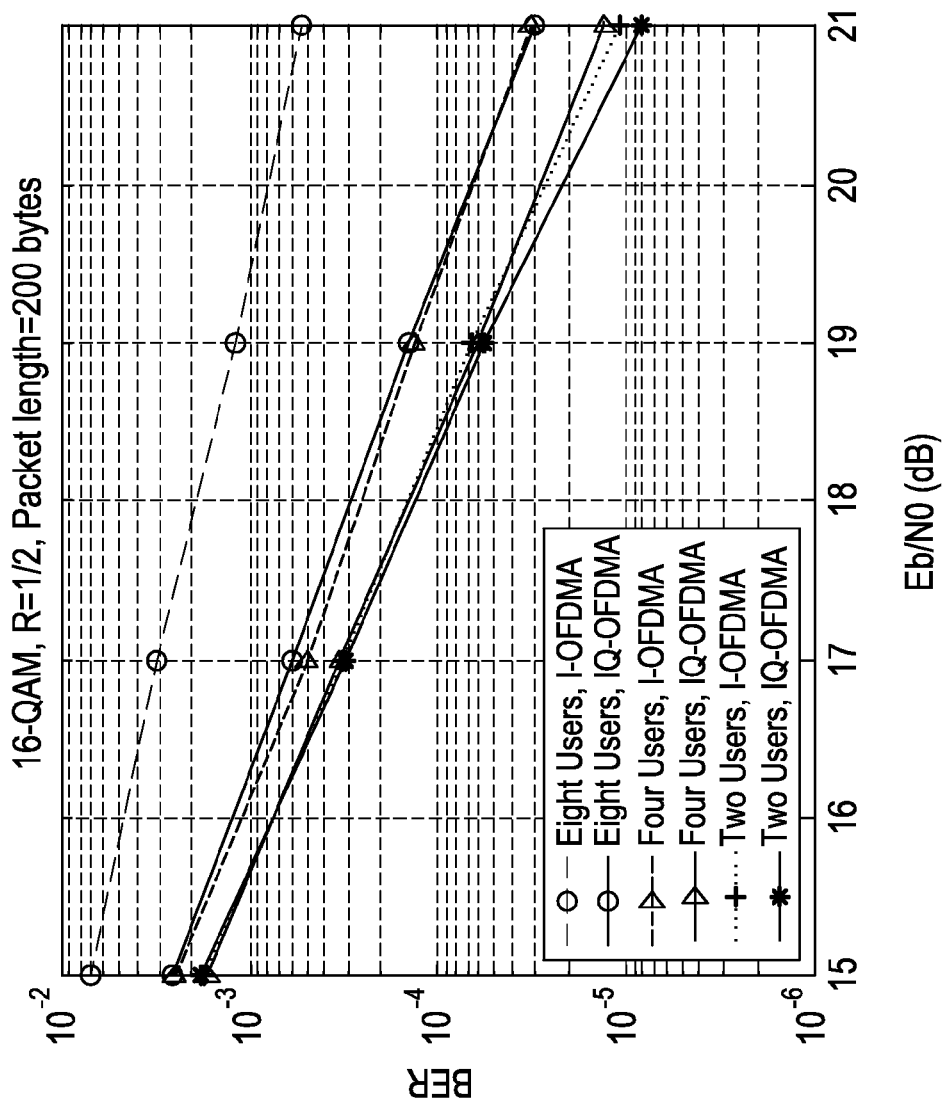
FIG. 16 is a graph showing the results of a simulation comparing the BER performance of IQ-OFDMA and I-OFDMA system in which all users transmit an OFDM signal having a packet length of 200 bytes.
Figure 17:
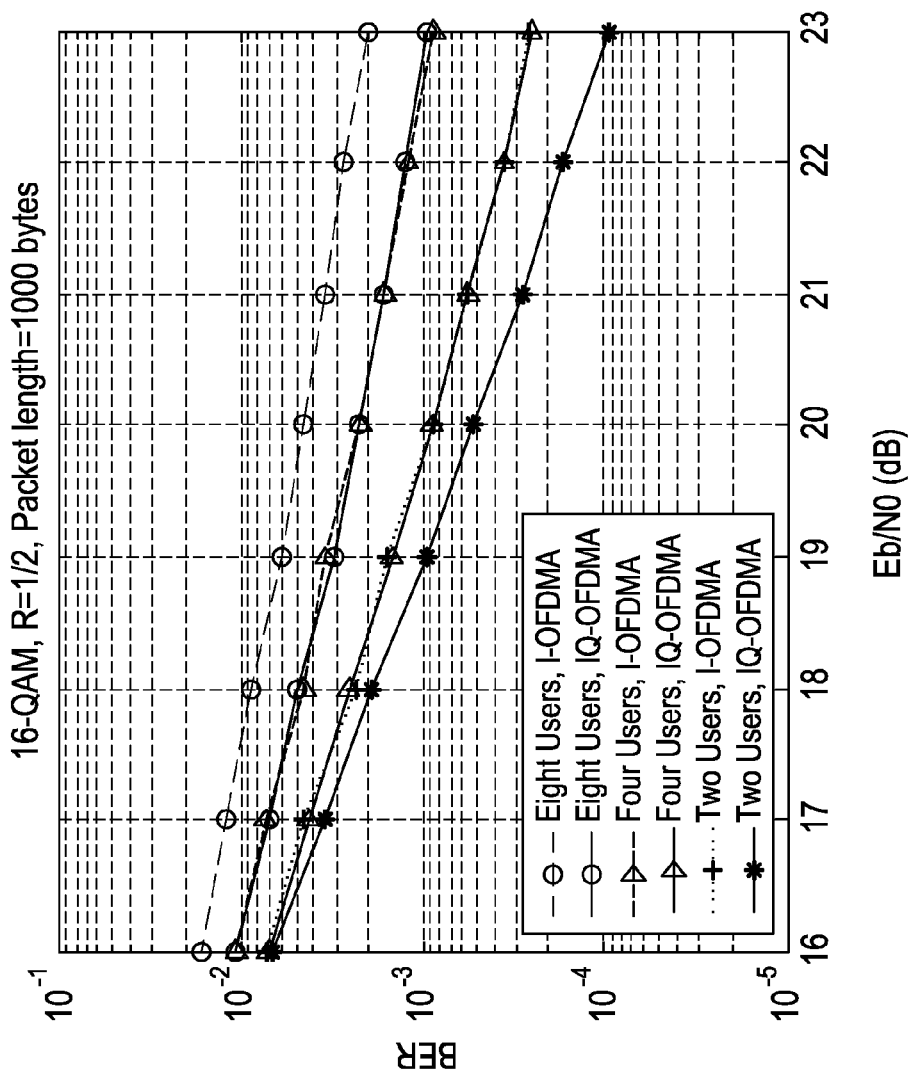
FIG. 17 is a graph showing the results of a simulation comparing the BER performance of IQ-OFDMA and I-OFDMA system in which all users transmit a CP-SC signal having a packet length of 1000 bytes.
Figure 18:
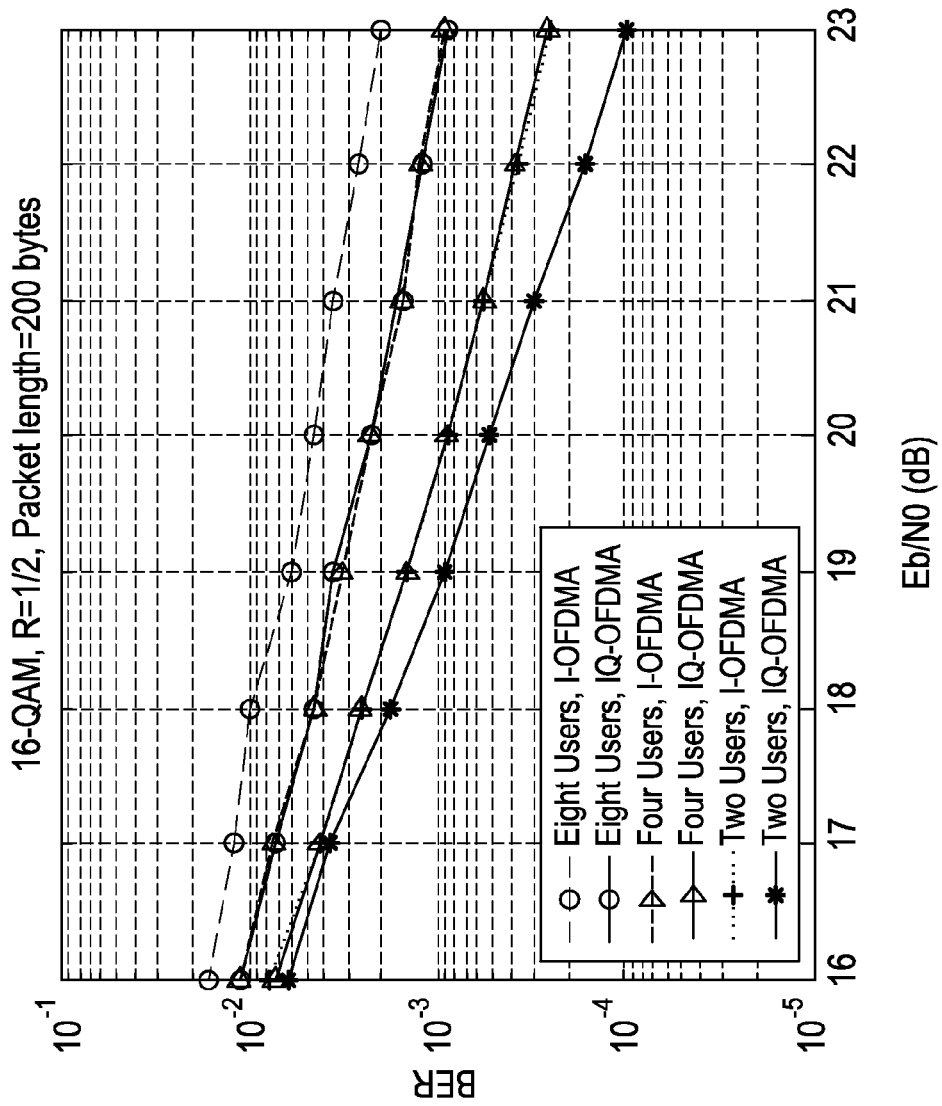
FIG. 18 is a graph showing the results of a simulation comparing the BER performance of IQ-OFDMA and I-OFDMA system in which all users transmit a CP-SC signal having a packet length of 200 bytes.
Figure 19:
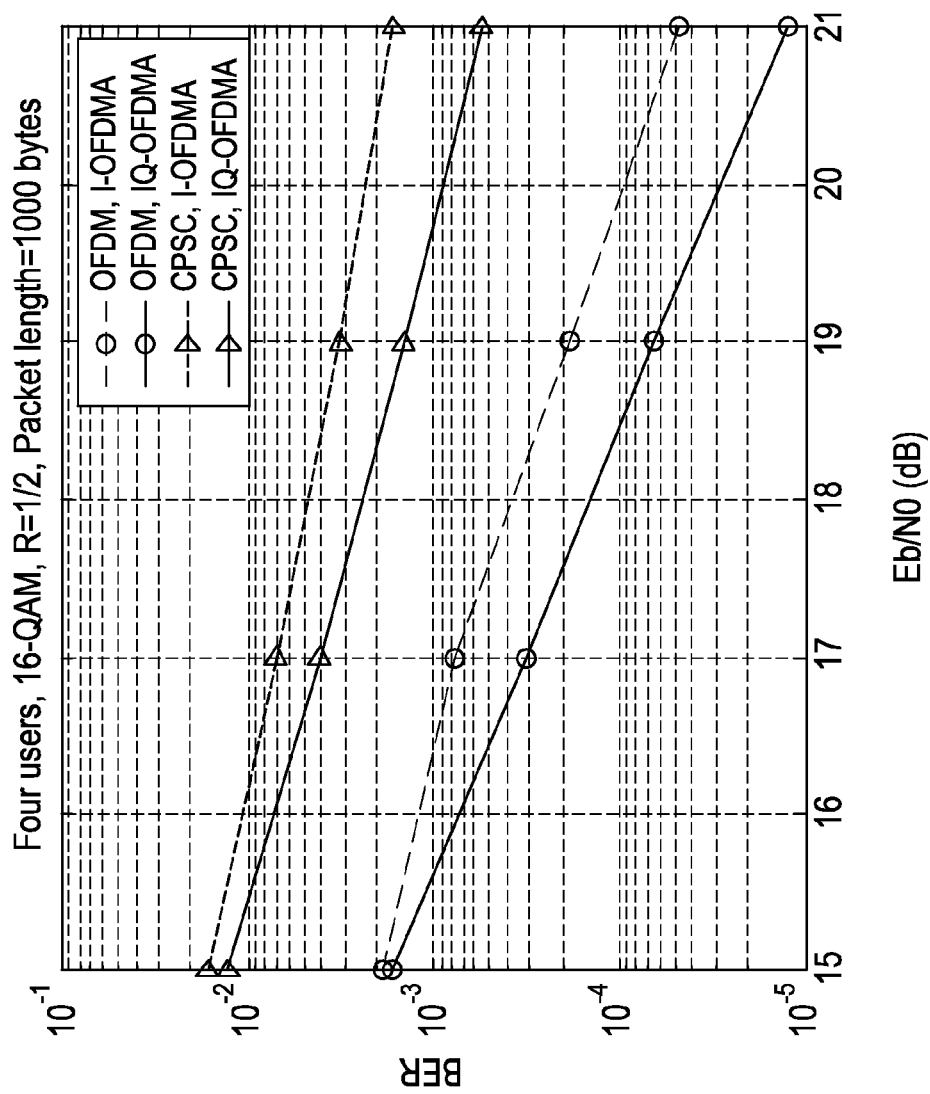
FIG. 19 is a graph showing the results of a simulation comparing the BER performance of IQ-OFDMA and I-OFDMA system in which two users transmit an OFDM signal having a packet length of 1000 bytes and two users transmit a CP-SC signal having a packet length of 1000 bytes.
Figure 20:
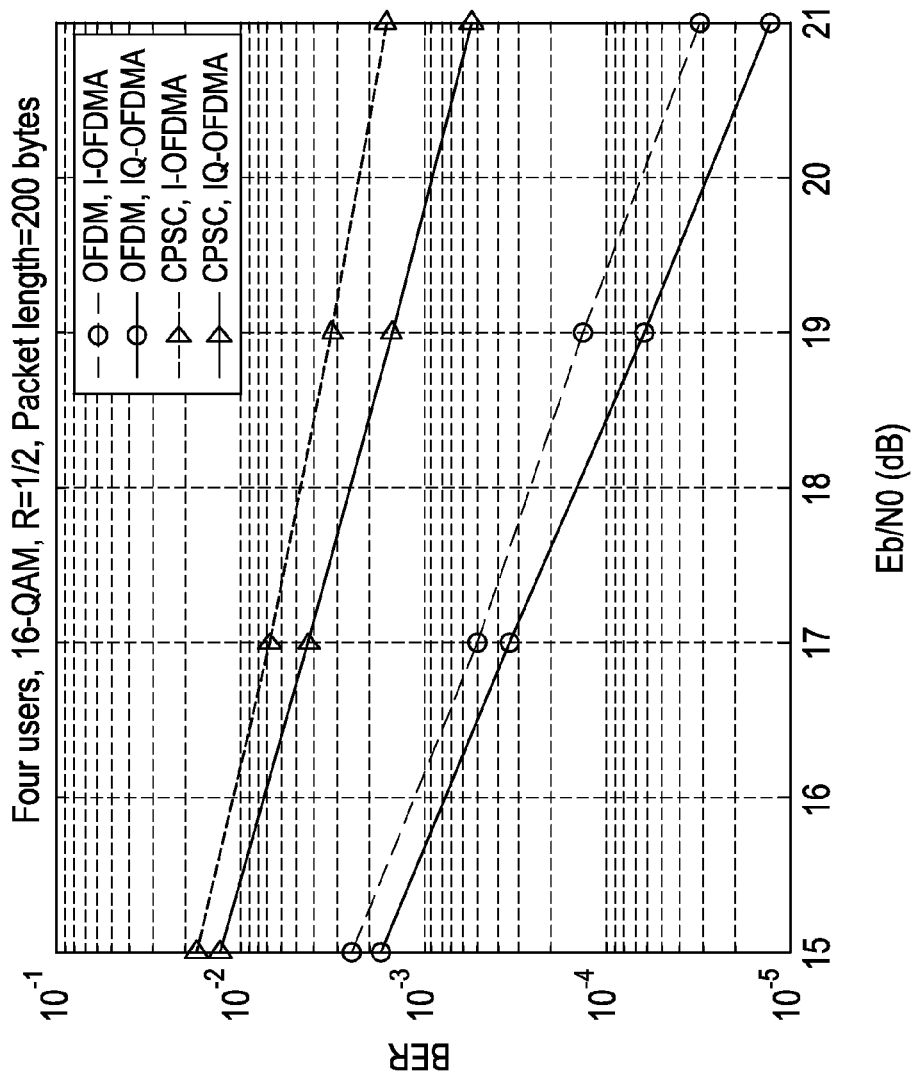
FIG. 20 is a graph showing the results of a simulation comparing the BER performance of IQ-OFDMA and I-OFDMA system in which two users transmit an OFDM signal having a packet length of 200 bytes and two users transmit a CP-SC signal having a packet length of 200 bytes.

FIGS. 15 through 20 compare the bit error rate (BER) performance of IQ-OFDMA and I-OFDMA systems. The simulation results of packet lengths 1000 bytes and 200 bytes are shown. In FIG. 15 and FIG. 16, all the users transmit OFDM signals. In FIG. 17 and FIG. 18, all the users transmit CP-SC signals. In FIG. 19 and FIG. 20, the system contains four users, two of which transmit CP-SC signals and two of which transmit OFDM signals. The CP-SC signals and OFDM signals are alternate in the frequency domain. The root-mean-squared (rms) delay spread of the channel is about 150 ns. The FFT length, N, is 64, the CP length is 16, and the sampling frequency is 20 MHz. For both of the two systems, the BER performance degrades as the number of users increases. The BER performance of IQ-OFDMA system is superior to I-OFDMA system, especially for the cases of more than two users. Generally, the IQ-OFDMA system with K users is comparable to the I-OFDMA system with K/2 users.

Embodiments of the invention can be applied to any system where in-phase and quadrature-phase can be assigned to different users in the system (in addition to the frequency (subcarrier) domain). Although exemplary embodiments are described above, the multiple access technique can also be applied to polarized antennas system that can be separated into in-phase and quadrature paths.

While the above description has pointed out novel features of the invention as applied to various embodiments, the skilled person will understand that various omissions, substitutions, and changes in the form and details of the device or process illustrated may be made without departing from the scope of the invention. For example, although the time and frequency domain have been extensively described, embodiments may multiplex signals into a wavelet domain or other transform domains. The various transforms can be performed by a Fourier transform, a FFT, a DFT, a Laplace transform, a z-transform, a discrete cosine transform (DCT), or other transforms. Therefore, the scope of the invention is defined by the appended claims rather than by the foregoing description. All variations coming within the meaning and range of equivalency of the claims are embraced within their scope.

What is claimed is:

1. A method of multiplexing signals, the method comprising:
receiving a pulse-amplitude modulated (PAM) orthogonal frequency-division multiplexing (OFDM) signal, the OFDM signal being real in frequency domain;
receiving a quadrature-amplitude modulated (QAM) cyclic-prefix single-carrier (CP-SC) signal, the CP-SC signal being complex in time domain;
inverse transforming the OFDM signal so as to generate an in-phase signal, the in-phase signal being complex in the time domain and real in the frequency domain, wherein the in-phase signal comprises a separate and complete signal;
concatenating complex-even and complex-odd portions of the CP-SC signal so as to generate a quadrature signal, the quadrature signal being complex in the time domain and imaginary in the frequency domain, wherein the quadrature signal comprises a separate and complete signal;
adding the in-phase signal and the quadrature signal so as to generate a single multiplexed signal; and
transmitting the single multiplexed signal,
wherein the in-phase signal and the quadrature signal occupy a same time interval and a same frequency band within the single multiplexed signal, and the in-phase signal and the quadrature signal are transmitted simultaneously over the same frequency band in the single multiplexed signal.

2. The method of claim 1, wherein the complex-even and complex-odd portions are transmitted in two adjacent symbols.

3. A method of multiplexing signals, the method comprising:
receiving a first signal having at least a real component;
receiving a second signal having at least a real component;
generating an in-phase signal based, at least in part, on the first signal, the in-phase signal being real in a first domain, wherein the in-phase signal comprises a separate and complete signal;
generating a quadrature signal based, at least in part, on the second signal, the quadrature signal being imaginary in the first domain, wherein the quadrature signal comprises a separate and complete signal;
adding the in-phase signal and the quadrature signal to generate a single multiplexed signal; and
transmitting the single multiplexed signal,
wherein the in-phase signal and the quadrature signal occupy a same time interval and a same frequency band in the single multiplexed signal, and the in-phase signal and the quadrature signal are transmitted simultaneously over the same frequency band in the single multiplexed signal.

4. The method of claim 3, wherein the first signal comprises a pulse-amplitude modulated (PAM) orthogonal frequency-division multiplexing (OFDM) signal that is real in the frequency domain.

5. The method of claim 4, wherein the first signal encodes data in the frequency domain.

6. The method of claim 5, wherein the first signal is real and wherein generating an in-phase signal comprises inverse Fourier transforming the first signal.

7. The method of claim 5, wherein the first signal is complex and wherein generating an in-phase signal comprises: multiplexing real component of the first signal and imaginary component of the first signal so as to generate a real signal; and inverse Fourier transforming the real signal.

8. The method of claim 7, wherein multiplexing real and imaginary components of the first signal comprises concatenating, interleaving, time-division multiplexing, or code-division multiplexing real and imaginary components of the first signal.

9. The method of claim 4, wherein the first signal encodes data in the time domain.

10. The method of claim 9, wherein the first signal is real and wherein generating an in-phase signal comprises adding even component of the first signal to a 90-degree-rotated version of odd component of the first signal.

11. The method of claim 9, wherein the first signal is complex and wherein generating an in-phase signal comprises: multiplexing real component of the first signal and imaginary component of the first signal so as to generate a multiplexed signal; and adding even component of the multiplexed signal to a 90-degree-rotated version of odd component of the multiplexed signal.

12. The method of claim 9, wherein the first signal is complex and wherein generating an in-phase signal comprises separately transmitting complex-even component of the first signal and a 90-degree-rotated version of complex-odd component of the first signal.

13. The method of claim 4, wherein the second signal encodes data in the frequency domain.

14. The method of claim 13, wherein the second signal is real and wherein generating a quadrature signal comprises inverse Fourier transforming a 90-degree-rotated version of the second signal.

15. The method of claim 13, wherein the second signal is complex and wherein generating a quadrature signal comprises:
  multiplexing real component of the second signal and imaginary component of the second signal so as to generate a real signal; and
  inverse Fourier transforming a 90-degree-rotated version of the real signal.

16. The method of claim 15, wherein multiplexing real and imaginary components of the second signal comprises concatenating, interleaving, time-division multiplexing, or code-division multiplexing real and imaginary components of the second signal.

17. The method of claim 4, wherein the second signal encodes data in the time domain.

18. The method of claim 17, wherein the second signal is real and wherein generating a quadrature signal comprises adding odd component of the second signal to a 90-degree-rotated version of even component of the second signal.

19. The method of claim 17, wherein the second signal is complex and wherein generating a quadrature signal comprises:
  multiplexing real component of the second signal and imaginary component of the second signal so as to generate a multiplexed signal; and
  adding odd component of the multiplexed signal to a 90-degree-rotated version of even component of the multiplexed signal.

20. The method of claim 17, wherein the second signal is complex and wherein generating a quadrature signal comprises separately transmitting complex-odd component of the second signal and a 90-degree-rotated version of complex-even component of the second signal.

21. The method of claim 4, wherein the first signal is a pulse-amplitude modulated orthogonal frequency-division multiplexing (OFDM) signal and the second signal is a quadrature-amplitude modulation cyclic prefix single-carrier (CP-SC) signal.

22. The method of claim 3, further comprising appending a cyclic prefix prior to transmission.

23. A method of demultiplexing signals, the method comprising:
  receiving a single multiplexed signal, the single multiplexed signal comprising a combined in-phase signal and a quadrature signal, the in-phase signal being real in a first domain and the quadrature signal being imaginary in the first domain, wherein the quadrature signal and the in-phase signal each comprises a separate and complete signal prior to being multiplexed, and the in-phase signal and the quadrature signal are received simultaneously over same frequency band in the single multiplexed signal;
  determining a first signal based on the in-phase signal; and
  determining a second signal based on the quadrature signal,
  wherein the in-phase signal and the quadrature signal occupy a same time interval and a same frequency band in the single multiplexed signal.

24. The method of claim 23, further comprising removing a cyclic prefix from the single multiplexed signal.

25. The method of claim 23, wherein the single multiplexed signal is received in the time domain and the first domain is the frequency domain, further comprising Fourier transforming the single multiplexed signal.

26. A system for multiplexing signals, the system comprising:
  a receiver that receives a first signal having at least a real component and a second signal having at least a real component;
  an in-phase generator that generates an in-phase signal based, at least in part, on the first signal, the in-phase signal being real in a first domain, wherein the in-phase signal comprises a separate and complete signal;
  a quadrature generator that generates a quadrature signal based, at least in part, on the second signal, the quadrature signal being imaginary in the first domain, wherein the quadrature signal comprises a separate and complete signal;
  an adder that adds the in-phase and quadrature signals for generating a single multiplexed signal; and
  a transmitter that transmits the single multiplexed signal,
  wherein the in-phase signal and the quadrature signal occupy a same time interval and a same frequency band in the single multiplexed signal, and the in-phase signal and the quadrature signal are transmitted simultaneously over the same frequency band in the single multiplexed signal.

27. The system of claim 26, wherein the first signal is a pulse-amplitude modulated (PAM) orthogonal frequency-division multiplexing (OFDM) signal and the second signal is a quadrature-amplitude modulated (QAM) cyclic-prefix single-carrier (CP-SC) signal.

28. The system of claim 26, wherein the first domain is the frequency domain.

29. The system of claim 26, wherein the in-phase generator is configured to generate the in-phase signal by inverse transforming the first signal and wherein the quadrature generator is configured to generate the quadrature signal by concatenating the complex-even and complex-odd portions of the second signal.

30. A system for demultiplexing signals, the system comprising:
  a receiver that receives a single multiplexed signal, the single multiplexed signal comprising a combined in-phase signal and a quadrature signal, the in-phase signal being real in a first domain and the quadrature signal being imaginary in the first domain, wherein the in-phase signal and the quadrature signal occupy a same time interval and a same frequency band in the single multiplexed signal, wherein the quadrature signal and the in-phase signal each comprises a separate and complete signal prior to being multiplexed, and the in-phase signal and the quadrature signal are received simultaneously over the same frequency band in the single multiplexed signal;

an in-phase demodulator that determines a first signal based on the in-phase signal; and a quadrature demodulator that determines a second signal based on the quadrature signal.

31. The system of claim 30, wherein the receiver is configured to receive the single multiplexed signal in the time domain and the first domain is the frequency domain, further comprising a Fourier transform module configured to Fourier transform the multiplexed signal.

32. A system for multiplexing signals, the system comprising:
means for receiving a first signal having at least a real component;
means for receiving a second signal having at least a real component;
means for generating an in-phase signal based, at least in part, on the first signal, the in-phase signal being real in a first domain, wherein the in-phase signal comprises a separate and complete signal;
means for generating a quadrature signal based, at least in part, on the second signal, the quadrature signal being imaginary in the first domain, wherein the quadrature signal comprises a separate and complete signal;
means for combining the in-phase signal and the quadrature signal to generate a single multiplexed signal; and
means for transmitting the single multiplexed signal,
wherein the in-phase signal and the quadrature signal occupy a same time interval and a same frequency band in the single multiplexed signal, and the in-phase signal and the quadrature signal are transmitted simultaneously over the same frequency band in the single multiplexed signal.

33. A system for demultiplexing signals, the system comprising:
means for receiving a single multiplexed signal, the single multiplexed signal comprising a combined in-phase signal and a quadrature signal, the in-phase signal being real in a first domain and the quadrature signal being imaginary in the first domain, wherein the in-phase signal and the quadrature signal occupy a same time interval and a same frequency band in the single multiplexed signal, wherein the quadrature signal and the in-phase signal each comprises a separate and complete signal prior to being multiplexed, and the in-phase signal and the quadrature signal are received simultaneously over the same frequency band in the single multiplexed signal;
means for determining a first signal based on the in-phase signal; and
means for determining a second signal based on the quadrature signal.

34. A non-transitory computer-readable storage medium having instructions encoded thereon which, when executed by one or more processors, performs a method of multiplexing signals, the method comprising:
receiving a first signal having at least a real component;
receiving a second signal having at least a real component;
generating an in-phase signal based, at least in part, on the first signal, the in-phase signal being real in a first domain, wherein the in-phase signal comprises a separate and complete signal;
generating a quadrature signal based, at least in part, on the second signal, the quadrature signal being imaginary in the first domain, wherein the quadrature signal comprises a separate and complete signal;
combining the in-phase signal and the quadrature signal to generate a single multiplexed signal; and
transmitting the single multiplexed signal,
wherein the in-phase signal and the quadrature signal occupy a same time interval and a same frequency band in the single multiplexed signal, and the in-phase signal and the quadrature signal are transmitted simultaneously over the same frequency band in the single multiplexed signal.

35. A non-transitory computer-readable storage medium having instructions encoded thereon which, when executed by one or more processors, performs a method of demultiplexing signals, the method comprising:
receiving a single multiplexed signal, the single multiplexed signal comprising a combined in-phase signal and a quadrature signal, the in-phase signal being real in a first domain and the quadrature signal being imaginary in the first domain, wherein the in-phase signal and the quadrature signal occupy a same time interval and a same frequency band in the single multiplexed signal, wherein the quadrature signal and the in-phase signal each comprises a separate and complete signal prior to being multiplexed, and the in-phase signal and the quadrature signal are received simultaneously over the same frequency band in the single multiplexed signal;
determining a first signal based on the in-phase signal; and
determining a second signal based on the quadrature signal.

36. The method of claim 1, wherein it is unnecessary for the first signal and the second signal to have real components in a same domain.

37. The method of claim 3, wherein the first domain comprises either time domain or frequency domain.

38. The method of claim 1, wherein the in-phase signal and the quadrature signal are separate and distinct signals.

39. The method of claim 1, wherein two signals are transmitted simultaneously over the same frequency band in the single multiplexed signal regardless of whether the two signals are real or complex, or in the frequency domain or time domain.

40. The method of claim 1, wherein two signals are transmitted simultaneously over the same frequency band in the single multiplexed signal, wherein the single multiplexed signal comprises a first signal being real in the frequency domain, and a second signal being complex in the time domain.

* * * * *